(12) United States Patent
Kurihara et al.

(10) Patent No.: US 10,951,817 B2
(45) Date of Patent: Mar. 16, 2021

(54) COMPOUND-EYE IMAGING DEVICE, IMAGE PROCESSING METHOD, AND RECORDING MEDIUM

(71) Applicant: Mitsubishi Electric Corporation, Tokyo (JP)

(72) Inventors: Kohei Kurihara, Tokyo (JP); Yoshitaka Toyoda, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/615,604

(22) PCT Filed: Jun. 26, 2017

(86) PCT No.: PCT/JP2017/023348
§ 371 (c)(1),
(2) Date: Nov. 21, 2019

(87) PCT Pub. No.: WO2019/003258
PCT Pub. Date: Jan. 3, 2019

(65) Prior Publication Data
US 2020/0177807 A1    Jun. 4, 2020

(51) Int. Cl.
*H04N 5/232*      (2006.01)
*H04N 5/225*      (2006.01)

(52) U.S. Cl.
CPC ....... *H04N 5/23232* (2013.01); *H04N 5/2254* (2013.01)

(58) Field of Classification Search
CPC ............. H04N 5/23232; H04N 5/2254; H04N 5/2258; H04N 5/343; H04N 5/369; H04N 9/07
See application file for complete search history.

(56) References Cited

U.S. PATENT DOCUMENTS

| | | |
|---|---|---|
| 7,009,652 B1 | 3/2006 | Tanida et al. |
| 2004/0240052 A1* | 12/2004 | Minefuji .............. H04N 5/2254 359/435 |

(Continued)

FOREIGN PATENT DOCUMENTS

| | | |
|---|---|---|
| JP | 2001-61109 A | 3/2001 |
| JP | 2005-303694 A | 10/2005 |

(Continued)

OTHER PUBLICATIONS

International Search Report for PCT/JP2017/023348 (PCT/ISA/210) dated Aug. 15, 2017.

(Continued)

*Primary Examiner* — Gevell V Selby
(74) *Attorney, Agent, or Firm* — Birch, Stewart, Kolasch & Birch, LLP

(57) ABSTRACT

A compound-eye imaging device includes a camera device and a processor including a resolution enhancer. The camera device includes an imaging element including imaging regions including at least one imaging region of a first type and imaging regions of a second type smaller than the imaging region of the first type; lenses to image images of the same field of view onto the imaging regions; and optical filters provided so that an image acquired in each of the imaging regions of the second type represents a different type of information from an image acquired in each of the at least one imaging region of the first type. The resolution enhancer receives the image acquired in one of the at least one imaging region of the first type and the image acquired in one of the imaging regions of the second type, and generates a high-resolution image from the acquired images.

12 Claims, 18 Drawing Sheets

(56) References Cited

U.S. PATENT DOCUMENTS

| 2010/0060746 | A9* | 3/2010 | Olsen ................ H04N 5/2254 |
| | | | 348/222.1 |
| 2013/0093842 | A1* | 4/2013 | Yahata ............... H04N 5/23238 |
| | | | 348/38 |
| 2015/0312496 | A1 | 10/2015 | Konno et al. |
| 2018/0184055 | A1 | 6/2018 | Kikuchi |
| 2018/0270404 | A1 | 9/2018 | Ishida et al. |

FOREIGN PATENT DOCUMENTS

| JP | 2009-117976 A | 5/2009 |
| WO | WO 2014/091985 A1 | 6/2014 |
| WO | WO 2015/182447 A1 | 12/2015 |
| WO | WO 2017/064760 A1 | 4/2017 |
| WO | WO 2017/090437 A1 | 6/2017 |

OTHER PUBLICATIONS

Jun Tanida, "Compound-Eye Imaging Systems", Japan Society of Applied Physics, vol. 39, No. 7, (2010), total of 8 pages.
Office Action dated Nov. 14, 2017 in connection with counterpart Japanese Patent Application No. 2017-549829.

* cited by examiner

COMPOUND-EYE IMAGING DEVICE, IMAGE PROCESSING METHOD, AND RECORDING MEDIUM

TECHNICAL FIELD

The present invention relates to a camera device, a compound-eye imaging device, and an image processing method.

In particular, the present invention relates to a camera device for imaging images of the same field of view onto multiple imaging regions and acquiring multiple images representing different types of information in the multiple imaging regions. The present invention also relates to a compound-eye imaging device including a processor for enhancing the resolutions of the multiple images acquired by the above camera device. The present invention further relates to an image processing method implemented by the above compound-eye imaging device.

The present invention further relates to a program for causing a computer to execute processing of the above compound-eye imaging device or image processing method, and a recording medium storing the program.

BACKGROUND ART

In recent years, requirements for imaging devices have become diversified more and more, and for example, it has been desired to acquire not only an RGB visible image but also additional information. In particular, near-infrared light is suitable for monitoring, object recognition, or the like and attracts attention in the fields of monitoring cameras, in-vehicle cameras, or the like, by virtue of the feature that near-infrared light has higher transmittance than airglow and is invisible. Also, images obtained only from light having a specific polarization direction are useful for removing light reflected from windows, road surfaces, or the like and recognizing hard-to-see objects, such as black objects or transparent objects, and attract attention in the fields of in-vehicle cameras and inspection cameras used in factory automation (FA).

Conventionally, such different information has been commonly acquired instead of usual color images. As the simplest means for simultaneously acquiring a color image and different information, there is a camera array with multiple cameras arranged; however, there are problems in that the cameras need to be accurately positioned, the device is upsized, and the installation cost and maintenance cost are increased.

Also, RGB-X sensors, i.e., sensors that are provided with filters transmitting only near-infrared light or other elements in color filter arrays and thus are capable of simultaneously acquiring different information have recently appeared. However, such sensors require much cost and time in design and development, and have many problems in terms of manufacturing.

As a small device that solves these problems, there is proposed a device that has an imaging element divided into multiple imaging regions and images, onto the multiple imaging regions, respective images (see Patent Literature 1). This device is provided with different optical filters for the multiple imaging regions, and thereby capable of simultaneously acquiring different information. The device of Patent Literature 1 has the advantage that it can be manufactured by placing a lens array on a single imaging element and is easily downsized.

CITATION LIST

Patent Literature

Patent Literature 1: Japanese Patent Application Publication No. 2001-61109 (paragraphs 0061 and 0064)

SUMMARY OF INVENTION

Technical Problem

In the device of Patent Literature 1, while the division of the imaging element makes it possible to simultaneously acquire multiple images from the single imaging element, there is a problem in that increasing the number of imaging regions decreases the number of pixels per imaging region, i.e., the resolution.

The present invention has been made to solve the above problems, and is intended to provide a compound-eye camera capable of acquiring different types of information and acquiring high-priority information with high resolution.

Solution to Problem

A camera device of the present invention includes:
a plurality of imaging regions;
a plurality of lenses to image images of a same field of view onto the plurality of imaging regions; and
a plurality of optical filters,
wherein the plurality of imaging regions include at least one imaging region of a first type and a plurality of imaging regions of a second type having smaller areas and smaller numbers of pixels than the imaging region of the first type, and
wherein the plurality of optical filters are provided so that an image acquired in each of the imaging regions of the second type represents a different type of information from an image acquired in each of the at least one imaging region of the first type.

A compound-eye imaging device of the present invention includes:
the above camera device; and
a processor including at least one resolution enhancer,
wherein the at least one resolution enhancer receives, as a reference image, the image acquired in one of the at least one imaging region of the first type, receives, as a low-resolution image, the image acquired in one of the imaging regions of the second type, and enhances a resolution of the low-resolution image by using a high-resolution component included in the reference image to generate a high-resolution image.

Advantageous Effects of Invention

With the camera device of the present invention, since the camera device includes the multiple imaging regions, it is possible to acquire images representing different types of information. Also, since the multiple imaging regions include the at least one imaging region of the first type and the multiple imaging regions of the second type having smaller areas and smaller numbers of pixels than the imaging region of the first type, by assigning a relatively large imaging region to high-priority information, i.e., an image that is more strongly desired to be acquired with high resolution, of the different types of information, it is possible to acquire such an image with high resolution.

With the compound-eye imaging device of the present invention, since the resolution enhancer enhances the resolution of the low-resolution image, even when the imaging region is relatively small, it is possible to obtain an image having high resolution.

DESCRIPTION OF EMBODIMENTS

First Embodiment

Figure 1B:
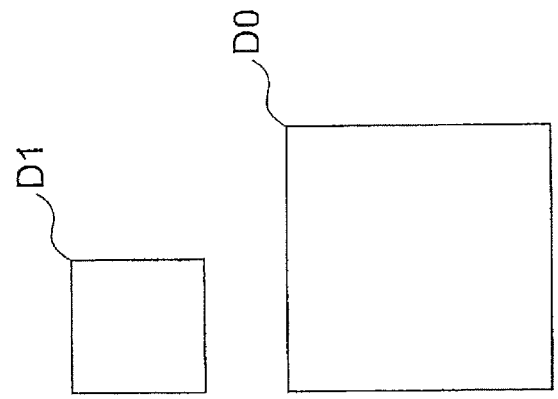
FIG. 1B is a diagram illustrating the sizes of images acquired by the above compound-eye camera.
Figure 1A:
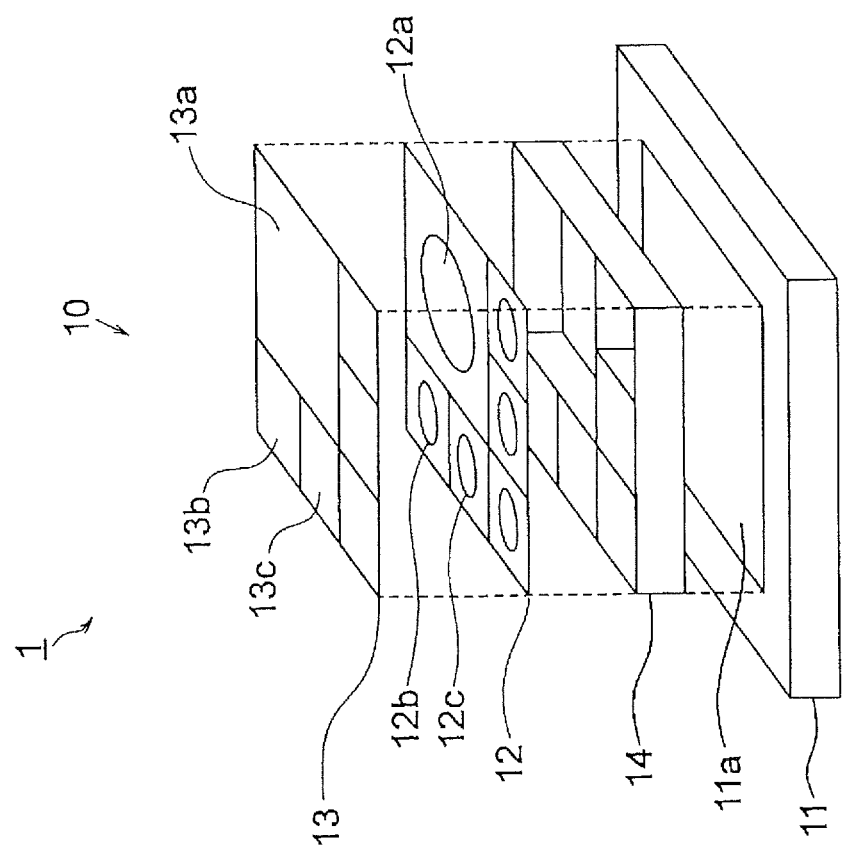
FIG. 1A is an exploded perspective view illustrating a configuration of a compound-eye camera forming a camera device according to a first embodiment of the present invention.

FIG. 1A is an exploded perspective view schematically illustrating a camera device 1 according to a first embodiment of the present invention.

The camera device 1 illustrated in FIG. 1A includes a compound-eye camera 10. The compound-eye camera 10 includes an imaging element 11, a lens array 12, a filter array 13, and a partition 14.

Figure 2A:
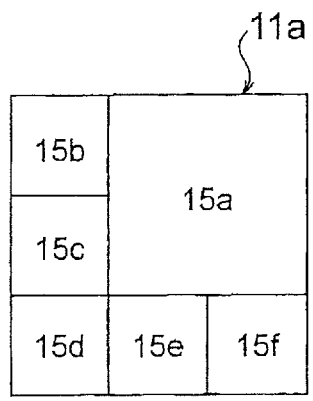
FIGS. 2A to 2D are schematic diagrams illustrating different examples of how to divide an imaging surface of an imaging element of the compound-eye camera of FIG. 1A.

The imaging element 11 has a rectangular imaging surface 11a, and the imaging surface 11a is divided into multiple rectangular imaging regions 15a to 15f, for example, as illustrated in FIG. 2A.

The lens array 12 includes multiple lenses 12a, 12b, provided to correspond to the respective imaging regions 15a, 15b, . . . The multiple lenses 12a, 12b, . . . constitute a lens group.

The lenses 12a, 12b, . . . are configured so that images of the same field of view are imaged onto the respective corresponding imaging regions 15a, 15b, To image images of the same field of view onto the imaging regions having different sizes, for example, lenses corresponding to larger imaging regions have longer focal lengths.

The filter array 13 includes optical filters 13a, 13b, . . . provided to respective one or more of the multiple imaging regions.

The partition 14 is provided between the imaging regions 15a, 15b, . . . and prevents each imaging region from receiving light from the lenses other than the corresponding lens.

The imaging element 11 is preferably a sensor having a CMOS or CCD structure that allows obtained image signals to be read out pixel by pixel. Because of the division, an imaging element of the global shutter (simultaneous exposure and simultaneous readout) type that causes no image blur is preferable.

Of the imaging regions, the largest imaging region(s), specifically the imaging region 15a having the largest number of pixels, will be referred to as high-resolution imaging region(s), and the other imaging regions 15b, 15c, . . . will be referred to as low-resolution imaging regions. In the example illustrated in FIG. 2A, the imaging surface 11a is square (the number of pixels in a vertical direction and the number of pixels in a horizontal direction are equal to each other), the imaging regions 15a to 15f are also square, the imaging regions 15b to 15f have the same size and thus have the same number of pixels, and the imaging region 15a has dimensions in the vertical and horizontal directions that are twice those of each of the imaging regions 15b to 15f.

Since the numbers of pixels in the vertical and horizontal directions of the high-resolution imaging region 15a are twice those of each of the low-resolution imaging regions 15b, 15c, . . . , the size (number of pixels) of an image (high-resolution image) D0 acquired in the high-resolution imaging region is four times that of an image (low-resolution image) D1 acquired in each low-resolution imaging region, as illustrated in FIG. 1B.

As described above, the high-resolution imaging region differs in resolution from the low-resolution imaging regions, and the former is higher in resolution. For distinction, the former may be referred to as an imaging region of the first type, and the latter may be referred to as imaging regions of the second type.

The optical filters 13a, 13b, . . . constituting the filter array 13 include optical filters having different optical properties, so that different types of information (images representing different types of information) are acquired from the respective imaging regions.

For example, the optical filters 13a, 13b, . . . having different optical properties are provided to one or more of the imaging regions 15a, 15b, . . . , so that images representing different types of information are acquired in the respective imaging regions.

As the optical filters having different optical properties, for example, at least one of a spectral filter, a polarization filter, and a neutral density (ND) filter is used, and by using these, images resulting from light in different wavelength ranges, images resulting from light having different polarization directions, or images resulting from imaging at different exposure amounts are acquired in the respective imaging regions.

These optical filters may be used alone or in combination.

The above-described "images resulting from light in different wavelength ranges" refer to images obtained by photoelectrically converting light in specific wavelength ranges, and the "images resulting from light having different polarization directions" refer to images obtained by photoelectrically converting light having specific polarization directions.

For example, it is possible to provide the high-resolution imaging region 15a with a G (green) transmission filter having high transmittance, an infrared cut filter, or an optical filter of a complementary color system, or it is possible to provide no optical filter to the high-resolution imaging region 15a (set the high-resolution imaging region 15a to be a monochrome region).

Optical filters of a complementary color system generally have high optical transmittance, and are preferable in this respect.

Here, providing no optical filter means providing no optical filter intended to acquire different types of images, and an optical filter for another purpose may be provided.

Also, depending on the lens design, in some cases, a clear aperture of a lens provided to the high-resolution imaging region is larger than those of the low-resolution imaging regions, and thus the exposure amount in the high-resolution imaging region is large. Providing an optical filter, such as an ND filter, that decreases the amount of transmitted light to the high-resolution imaging region can prevent the differences in exposure amount between the high-resolution imaging region and the low-resolution imaging regions from being large, and prevent excess of the exposure amount in the high-resolution imaging region and shortage of the exposure amounts in the low-resolution imaging regions.

The method of dividing the imaging surface 11a into imaging regions is not limited to the example of FIG. 2A.

The larger an imaging region, the higher the resolution of the acquired image. Meanwhile, increasing the number of imaging regions makes it possible to increase the number of filters having different optical properties or the number of different combinations of filters having different optical properties, thereby increasing the number of types of information acquired by the imaging element 11.

FIGS. 2B to 2D and FIGS. 3A and 3B illustrate dividing methods differing from that of FIG. 2A.

Figure 2B:
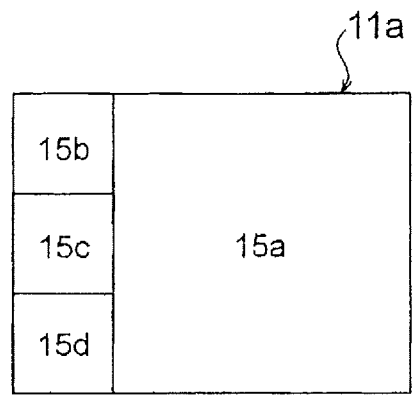

In the example of FIG. 2B, the imaging surface 11a is rectangular, the ratio of the vertical and horizontal dimensions is 3:4, and the imaging surface 11a is divided into one high-resolution imaging region 15a and three low-resolution imaging regions 15b to 15d. These imaging regions 15a to 15d are each square. The low-resolution imaging regions 15b to 15d are vertically arranged in order in a strip-shaped portion occupying the left quarter of the imaging surface 11a, and the high-resolution imaging region 15a is arranged in the remaining portion.

A center of the low-resolution imaging region 15c located at the middle in the vertical direction and a center of the high-resolution imaging region 15a are horizontally aligned. Such an arrangement makes it possible to obtain depth information by performing stereo matching by using displacement due to parallax between the image acquired in the low-resolution imaging region 15c and the image acquired in the high-resolution imaging region 15a.

In the examples of FIGS. 2C and 2D and FIGS. 3A and 3B, the imaging surface 11a and imaging regions 15a, 15b, . are each square.

Figure 2C:
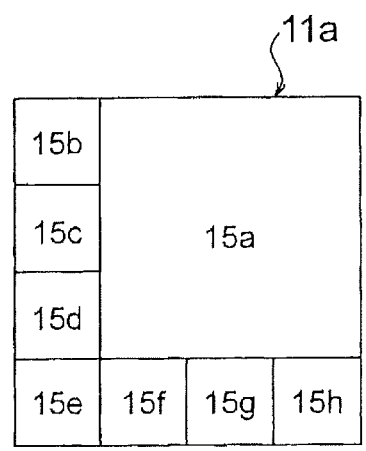

In the example of FIG. 2C, the imaging surface 11a is divided into one high-resolution imaging region 15a and seven low-resolution imaging regions 15b to 15h. Specifically, the low-resolution imaging regions 15b to 15h are arranged in a strip-shaped portion occupying the left quarter of the imaging surface 11a and a strip-shaped portion occupying the lower quarter of the imaging surface 11a, and the high-resolution imaging region 15a is arranged in the remaining portion.

The imaging surface 11a of FIG. 2C is larger than the imaging surface 11a of FIG. 2A, and the high-resolution imaging region 15a of FIG. 2C is larger than the high-resolution imaging region 15a of FIG. 2A and is capable of acquiring an image D0 having a higher resolution. Also, a center of the low-resolution imaging region 15c located second from the top in the left strip-shaped portion and a center of the high-resolution imaging region 15a are horizontally aligned, a center of the low-resolution imaging region 15g located second from the right in the lower strip-shaped portion and a center of the high-resolution imaging region 15a are vertically aligned, and it is possible to accurately obtain depth information in both the horizontal and vertical directions by performing multi-view stereo matching.

Figure 2D:
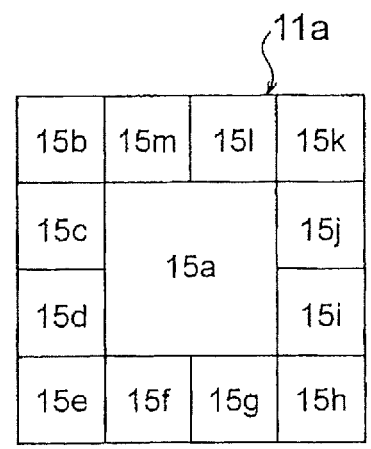

In the example of FIG. 2D, the imaging surface 11a is divided into one high-resolution imaging region 15a and twelve low-resolution imaging regions 15b to 15m. Specifically, the low-resolution imaging regions 15b to 15m are vertically arranged in order in a strip-shaped portion occupying the left quarter of the imaging surface 11a, a strip-shaped portion occupying the lower quarter of the imaging surface 11a, a strip-shaped portion occupying the right quarter of the imaging surface 11a, and a strip-shaped portion occupying the upper quarter of the imaging surface 11a, and the high-resolution imaging region 15a is arranged in the remaining portion.

When the imaging surfaces 11a in the examples of FIGS. 2C and 2D have the same size, the high-resolution imaging region 15a of FIG. 2D is smaller than the high-resolution imaging region 15a of FIG. 2C. However, a larger number of low-resolution imaging regions 15b to 15m are provided, and a larger number of images D1 having different types of information can be acquired.

Figure 3A:
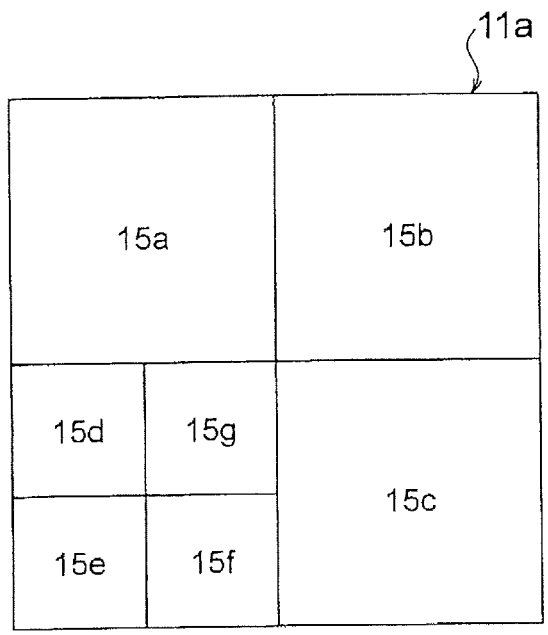
FIGS. 3A and 3B are schematic diagrams illustrating different examples of how to divide the imaging surface of the imaging element of the compound-eye camera of FIG. 1A.

In the example of FIG. 3A, the imaging regions include multiple high-resolution imaging regions and multiple low-resolution imaging regions. Specifically, the imaging surface 11a is divided into three high-resolution imaging regions 15a to 15c and four low-resolution imaging regions 15d to 15g.

With such division, the imaging surface 11a is divided into two in each of the vertical and horizontal directions, and the high-resolution imaging regions 15a to 15c are arranged in the left upper quarter, the right upper quarter, and the right lower quarter. Further, the left lower quarter is divided into two in each of the vertical and horizontal directions, and the respective divided regions form the four low-resolution imaging regions 15d to 15g.

The example of FIG. 3A can be used, for example, to acquire RGB information that is primary color information in the high-resolution imaging regions 15a to 15c and acquire wavelength information in other narrow bands or polarization information in the low-resolution imaging regions 15d to 15g. This makes it possible to acquire high-resolution images having color information with more natural color. RGB information can be acquired in the high-resolution imaging regions 15a to 15c by providing an R transmission filter, a G transmission filter, and a B transmission filter to the high-resolution imaging regions 15a to 15c. Likewise, wavelength information in a narrow band can be acquired by providing a narrowband transmission filter, and polarization information in a specific direction can be acquired by providing an optical filter that transmits a polarization component in the direction and attenuates polarization components in the other directions.

Figure 3B:
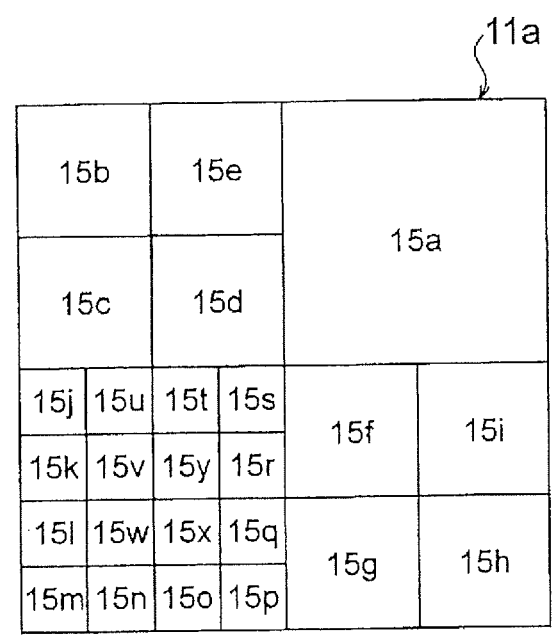

In the example of FIG. 3B, the imaging regions include, in addition to a high-resolution imaging region 15a, two types of imaging regions having different sizes. Specifically, each of imaging regions 15j to 15y of a second group has dimensions in the vertical and horizontal directions that are half those of imaging regions 15b to 15i of a first group.

For distinction, the imaging regions 15b to 15i of the first group may be referred to as intermediate-resolution imaging regions, and the imaging regions 15j to 15y of the second group may be referred to as low-resolution imaging regions.

Also, since the imaging regions 15b to 15i of the first group and the imaging regions 15j to 15y of the second group are lower in resolution than the high-resolution imaging region 15a, they may be referred to collectively as low-resolution imaging regions.

The arrangement of the imaging regions in the configuration of FIG. 3B will be described below in detail. The imaging surface 11a is divided into two in each of the vertical and horizontal directions, and the high-resolution imaging region 15a is arranged in the right upper quarter. The left upper quarter is divided into two in each of the vertical and horizontal directions, and the respective divided regions form the four low-resolution imaging regions 15b to 15e. Also, the right lower quarter is divided into two in each of the vertical and horizontal directions, and the respective divided regions form the four low-resolution imaging regions 15f to 15i. Further, the left lower quarter is divided into four in each of the vertical and horizontal directions, and the respective divided regions form the sixteen low-resolution imaging regions 15j to 15y.

Providing many imaging regions in this manner makes it possible to acquire many different types of information. Also, since imaging regions having different sizes are provided as the imaging regions other than the high-resolution imaging region, it is possible to assign imaging regions having different sizes depending on the type of information.

For example, when it is intended to acquire a multispectral image consisting of many narrowband images, it is possible to assign one or more of the relatively small imaging regions (low-resolution imaging regions) 15j to 15y to the narrowband images and provide them with narrowband bandpass filters, and assign one or more of the relatively large imaging regions (intermediate-resolution imaging regions) 15b to 15e to information, such as primary RGB color information, near-infrared information, or polarization information, required to have a somewhat high resolution and provide them with optical filters for acquiring the respective information.

As above, in the examples illustrated in FIGS. 2A to 2D and FIGS. 3A and 3B, the imaging regions are all square; however, the present invention is not limited to this, and they may be rectangular. Also, while the high-resolution imaging region(s) may be different in size from the low-resolution imaging regions and the low-resolution imaging regions may include multiple imaging regions having different sizes, it is preferable that all the imaging regions, including the high-resolution imaging region(s) and low-resolution imaging regions, have the same aspect ratio.

As exemplified in FIGS. 2A to 2D and FIGS. 3A and 3B, when multiple imaging regions are formed by dividing the imaging surface 11a, it is difficult to make the fields of view of the multiple imaging regions exactly coincide with each other. This is due to errors in the focal lengths of the lenses, aberrations of the lenses, or the like. When the fields of view of the multiple imaging regions do not exactly coincide with each other, the images acquired by imaging may be used after cutting out (removing edges of the images by trimming), for example.

Advantages obtained by the camera device 1 of the first embodiment will now be described.

Since in the camera device 1 of the first embodiment, the imaging surface of the imaging element of the compound-eye camera 10 forming the camera device is divided into multiple imaging regions, it is possible to acquire images representing different types of information.

Also, since the imaging regions include a relatively large imaging region and a relatively small imaging region, by assigning the relatively large imaging region to high-priority information, i.e., an image that is more strongly desired to be acquired with high resolution, of the different types of information, it is possible to acquire such an image with high resolution.

Thereby, for example, it is possible to acquire primary images, such as RGB visible light images, with high resolution, by assigning relatively large imaging regions to these images, and acquire many images having additional information, such as narrowband images, near-infrared images, or ultraviolet images for constituting a multispectral image, polarization images, or images at different exposure amounts, by assigning many relatively small imaging regions to these images.

Further, since the multiple imaging regions are formed in a single imaging element, it is possible to reduce the size of the camera device.

Second Embodiment

Figure 4:
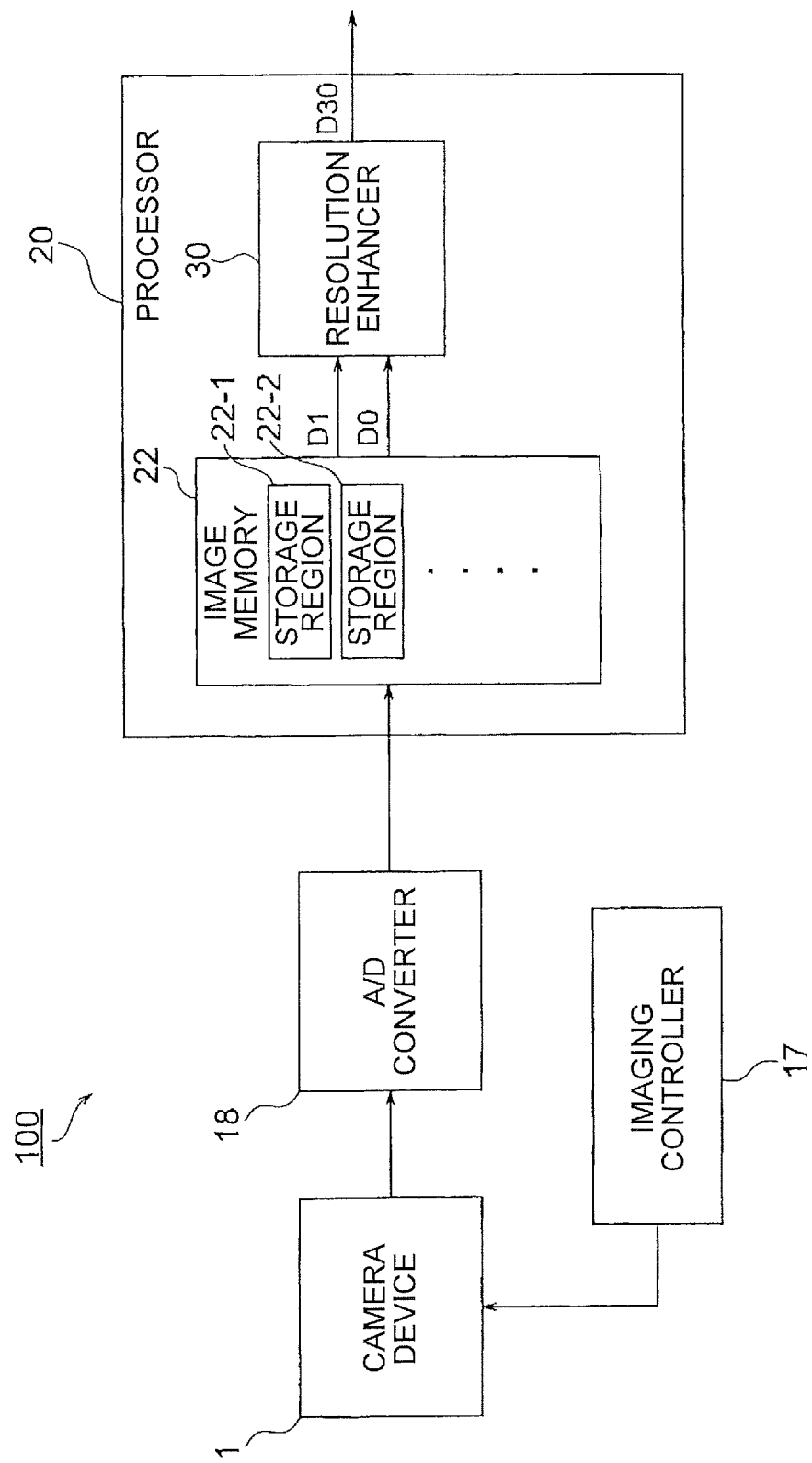
FIG. 4 is a block diagram illustrating a compound-eye imaging device according to a second embodiment of the present invention.

FIG. 4 is a block diagram illustrating a compound-eye imaging device 100 according to a second embodiment of the present invention. The compound-eye imaging device 100 illustrated in FIG. 4 includes a camera device 1, an imaging controller 17, an A/D converter 18, and a processor 20. As the camera device 1, that described in the first embodiment can be used.

The imaging controller 17 controls imaging by the camera device 1. For example, it controls the imaging timing or exposure time.

An imaging signal output from the camera device 1 is, after being subjected to processing, such as amplification, in an analog processor (not illustrated), converted to a digital image signal by the A/D converter 18, and input to the processor 20.

The processor 20 includes an image memory 22 and at least one resolution enhancer 30.

The image memory 22 preferably includes multiple storage regions 22-1, 22-2, . . . corresponding to the respective imaging regions of the compound-eye camera 10 forming the camera device 1. In this case, a digital image signal stored in each storage region represents an image acquired in the corresponding imaging region.

Of images stored in the respective storage regions 22-1, 22-2, . . . of the image memory 22, the images acquired in two imaging regions having different resolutions are supplied to the resolution enhancer 30.

For example, a high-resolution image acquired in the imaging region 15a of FIG. 2A and a low-resolution image acquired in the imaging region 15b of FIG. 2A are supplied to the resolution enhancer 30. Hereinafter, the high-resolution image acquired in the imaging region 15a will be denoted by reference character D0, and the low-resolution image acquired in the imaging region 15b will be denoted by reference character D1.

The resolution enhancer 30 enhances (or increases) the resolution of the low-resolution image D1 by using the high-resolution image D0 as a reference image to generate a high-resolution image D30.

On the assumption that the high-resolution image D30 to be generated and the reference image D0 are correlated with each other in image features (such as local gradients or patterns), the resolution enhancer 30 performs a process of transferring (reflecting) a high-resolution component of an object included in the reference image D0 to the low-resolution image D1 and thereby generating the high-resolution image D30 including the high-resolution component of the object. Further, it is possible to compare the low-resolution image D1 and the reference image D0, and perform adaptive processing depending on the position in the image in such a manner as to facilitate the transfer of the high-resolution component in image regions where the correlation is seen as being high and suppress the transfer of the high-resolution component in image regions where the correlation is seen as being low. This is because imaging conditions (such as a wavelength, polarization direction, or exposure amount) are different between the low-resolution image D1 and the reference image D0, and thus depending on the reflective property of the object, a high-resolution component of the low-resolution image D1 and the reference image D0 are not always correlated.

Figure 5:
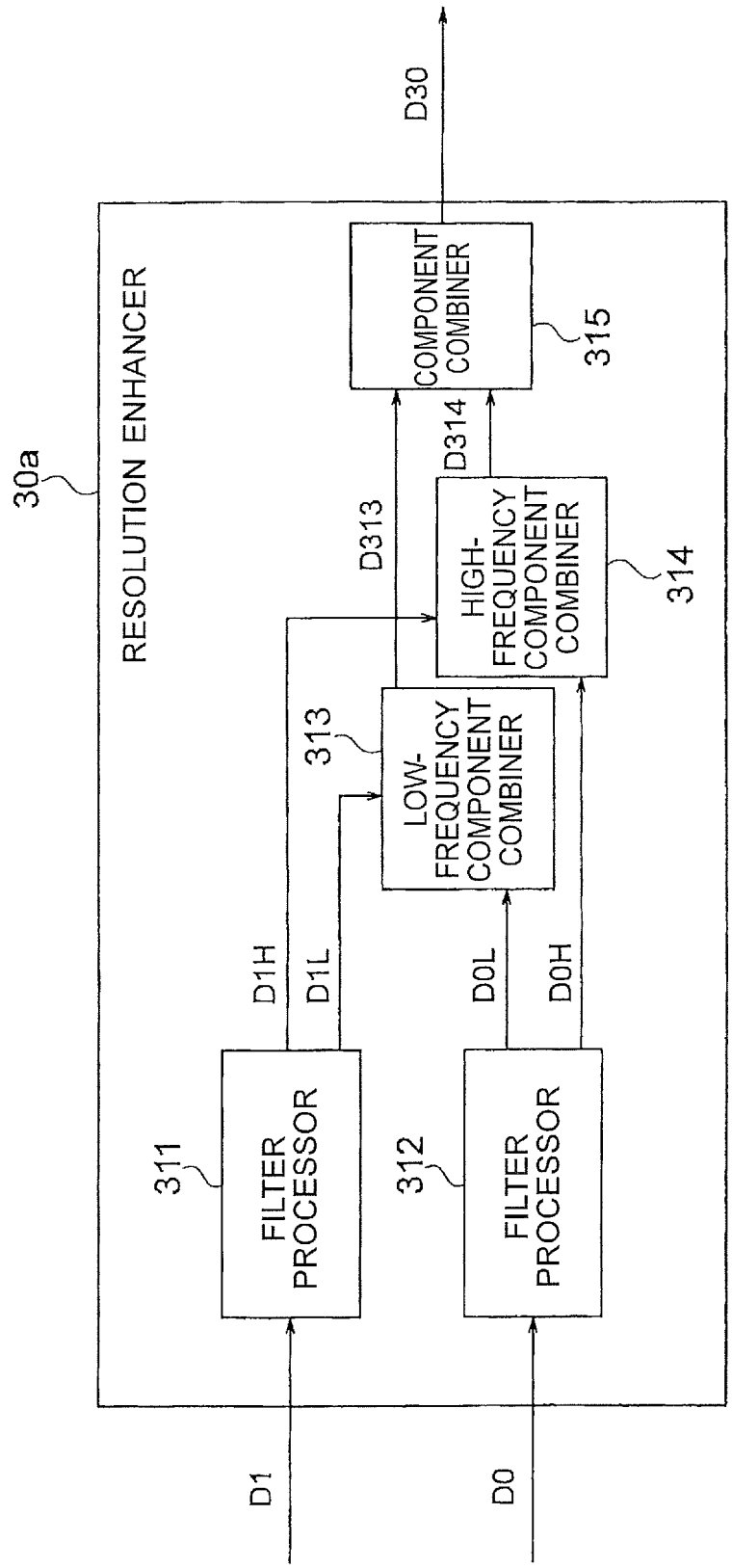
FIG. 5 is a block diagram illustrating an example of a resolution enhancer used in the second embodiment.

FIG. 5 illustrates a configuration example (denoted by reference character 30a) of the resolution enhancer 30.

The resolution enhancer 30a of FIG. 5 performs resolution enhancement by a method of separating a low-frequency component and a high-frequency component from each of the low-resolution image D1 and reference image D0 by filtering and combining them by component.

The resolution enhancer 30a illustrated in FIG. 5 includes filter processors 311 and 312, a low-frequency component combiner 313, a high-frequency component combiner 314, and a component combiner 315.

The filter processor (first filter processor) 311 extracts a low-frequency component D1L and a high-frequency component D1H from the low-resolution image D1. For example, the filter processor 311 performs smoothing filter processing on the low-resolution image D1 to extract the low-frequency component D1L, and generates the high-frequency component D1H of the image by obtaining a difference between the extracted low-frequency component D1L and the original image D1.

The filter processor (second filter processor) 312 extracts a low-frequency component D0L and a high-frequency component D0H from the reference image D0. For example, the filter processor 312 performs smoothing filter processing on the reference image D0 to extract the low-frequency component D0L, and generates the high-frequency component D0H of the image by obtaining a difference between the extracted low-frequency component D0L and the original image D0.

In the smoothing filter processing in the filter processors 311 and 312, a Gaussian filter, a bilateral filter, or the like can be used.

The low-frequency component combiner 313 enlarges the low-frequency component D1L to the same resolution as the reference image D0, and combines the enlarged low-frequency component and the low-frequency component D0L by weighted addition to generate a combined low-frequency component D313.

The high-frequency component combiner 314 enlarges the high-frequency component D1H to the same resolution as the reference image D0, and combines the enlarged high frequency component and the high-frequency component D0H by weighted addition to generate a combined high-frequency component D314.

The component combiner 315 combines the combined low-frequency component D313 and combined high-frequency component D314 to generate the high-resolution image D30.

In the configuration illustrated in FIG. 5, it is possible to improve resolution feeling by performing the combination while heavily weighting the high-frequency component D0H, having high resolution, included in the high-resolution image D0 in the combination in the high-frequency component combiner 314.

Figure 6:
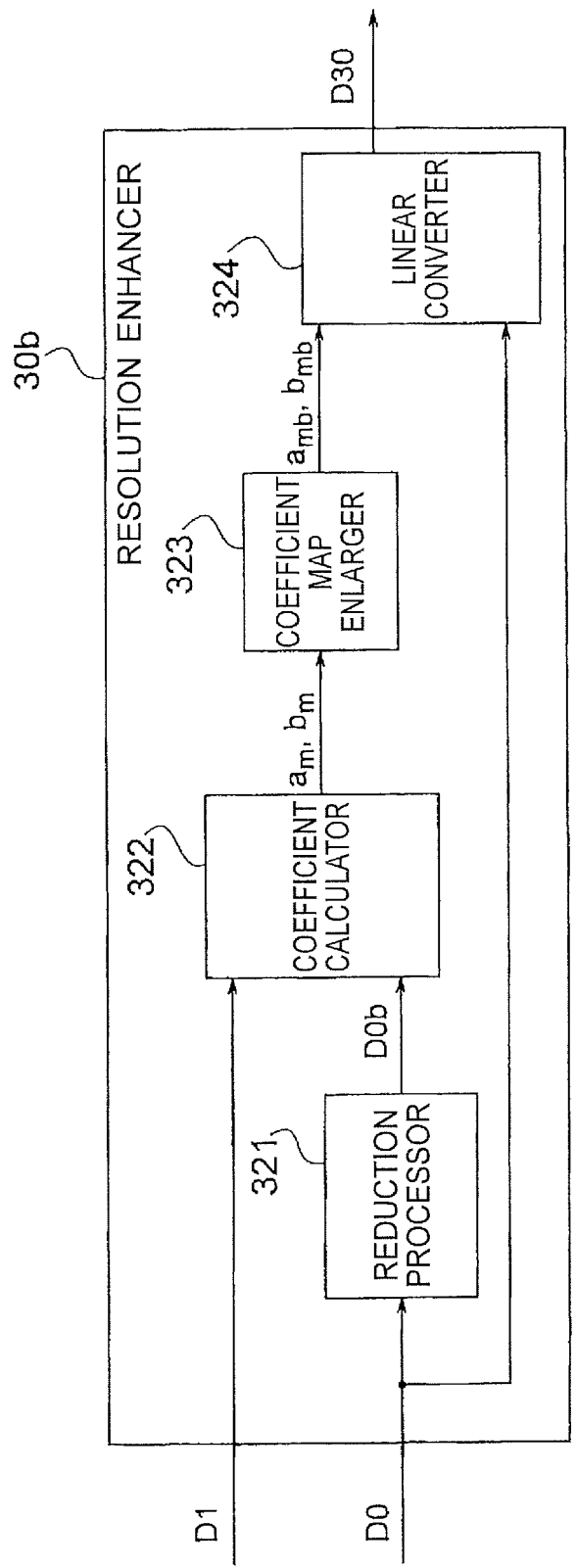
FIG. 6 is a block diagram illustrating another example of the resolution enhancer used in the second embodiment.

FIG. 6 illustrates another configuration example (denoted by reference character 30b) of the resolution enhancer 30.

The resolution enhancer 30b illustrated in FIG. 6 receives the low-resolution image D1 and reference image D0 and uses a guided filter to enhance the resolution of the low-resolution image D1 on the basis of the reference image D0.

The resolution enhancer 30b illustrated in FIG. 6 includes a reduction processor 321, a coefficient calculator 322, a coefficient map enlarger 323, and a linear converter 324.

The reduction processor 321 reduces the reference image D0 to generate a reduced reference image D0b having the same resolution as the low-resolution image D1.

The coefficient calculator 322 calculates linear coefficients $a_m$ and $b_m$ approximating a linear relationship between the reduced reference image D0b and the low-resolution image D1.

The coefficient calculator 322 first obtains a variance varI(x) of pixel values I(y) of the reduced reference image D0b in a local region $\Omega(x)$ centered on pixel position x, according to equation (1):

$$\mathrm{var}I(x) = \sum_{y \in \Omega(x)} I(y)^2 - \left(\sum_{y \in \Omega(x)} I(y)\right)^2. \tag{1}$$

In equation (1), I(x) is a pixel value of a pixel at pixel position x of the reduced reference image D0b.

I(y) is a pixel value of a pixel at pixel position y of the reduced reference image D0b.

Here, pixel position y is a pixel position in the local region $\Omega(x)$ centered on pixel position x.

The coefficient calculator 322 also obtains a covariance covIp(x) of the pixel values I(y) of the reduced reference image D0b and pixel values p(y) of the input image D1 in the local region $\Omega(x)$ centered on pixel position x, according to equation (2):

$$\text{cov}Ip(x) = \sum_{y \in \Omega(x)} (I(y) \cdot p(y)) - \left(\sum_{y \in \Omega(x)} I(y)\right) \cdot \left(\sum_{y \in \Omega(x)} p(y)\right). \quad (2)$$

In equation (2), I(x) and I(y) are as described for equation (1).

p(y) is a pixel value of a pixel at pixel position y of the input image D1.

The coefficient calculator 322 further calculates a coefficient a from the variance varI(x) obtained by equation (1) and the covariance covIp(x) obtained by equation (2), according to equation (3):

$$a(x) = \frac{\text{cov}Ip(x)}{\text{var}I(x) + eps}. \quad (3)$$

In equation (3), eps is a constant determining the degree of edge preservation, and is predetermined.

The coefficient calculator 322 further calculates a coefficient b(x) using the coefficient a(x) obtained by equation (3), according to equation (4):

$$b(x) = \sum_{y \in \Omega(x)} p(y) - a(x) \sum_{y \in \Omega(x)} I(y). \quad (4)$$

The coefficients a(x) and b(x) are referred to as linear regression coefficients.

The coefficient calculator 322 further calculates linear coefficients $a_m(x)$ and $b_m(x)$ by averaging the coefficients a(x) and b(x) obtained by equations (3) and (4) according to equation (5):

$$a_m(x) = \sum_{y \in \Omega(x)} a(y)^2, \; b_m(x) = \sum_{y \in \Omega(x)} b(y)^2. \quad (5)$$

The coefficient map enlarger 323 enlarges a coefficient map consisting of the linear coefficients $a_m(x)$ obtained by equation (5) in the coefficient calculator 322 and a coefficient map consisting of the linear coefficients $b_m(x)$ obtained by equation (5) in the coefficient calculator 322, to the same resolution as the reference image D0. The linear coefficients of the enlarged coefficient maps will be denoted by $a_{mb}(x)$ and $b_{mb}(x)$. A coefficient map is a map in which coefficients corresponding to all the pixels constituting an image are arranged at the same positions as the corresponding pixels.

The linear converter 324 generates a high-resolution image D30 having information represented by the low-resolution image D1, on the basis of the linear coefficients $a_{mb}$ and $b_{mb}$ of the enlarged coefficient maps and the reference image D0.

Specifically, the linear converter 324 uses the linear coefficients $a_{mb}$ and $b_{mb}$ of the enlarged coefficient maps to derive guided filter output values q according to equation (6):

$$q(x) = a_{mb}(x)J(x) + b_{mb}(x). \quad (6)$$

q(x) is a pixel value of a pixel at pixel position x of the high-resolution image D30.

J(x) is a pixel value of a pixel at pixel position x of the reference image D0.

Equation (6) indicates that the output of the guided filter (the pixel value of the image D30) q(x) and the pixel value J(x) of the reference image D0 have a linear relationship.

In the configuration illustrated in FIG. 6, the coefficient calculator 322 and linear converter 324 are basic components of the processing by the guided filter, and the reduction processor 321 and coefficient map enlarger 323 are added to reduce the processing load on the coefficient calculator 322.

By calculating the pixel values of the high-resolution image D30 as described above, it is possible to perform smoothing processing only on regions of the reduced reference image D0b in which the variance varI(x) is small, and preserve the texture of the other region.

Although the above resolution enhancer 30b performs processing using a guided filter, the present invention is not limited to this. The resolution enhancer 30b may use other methods, such as a method of enhancing the resolutions of images having different types of information on the basis of edge or gradient information of a high-resolution image, such as a method using a joint bilateral filter.

Figure 7:
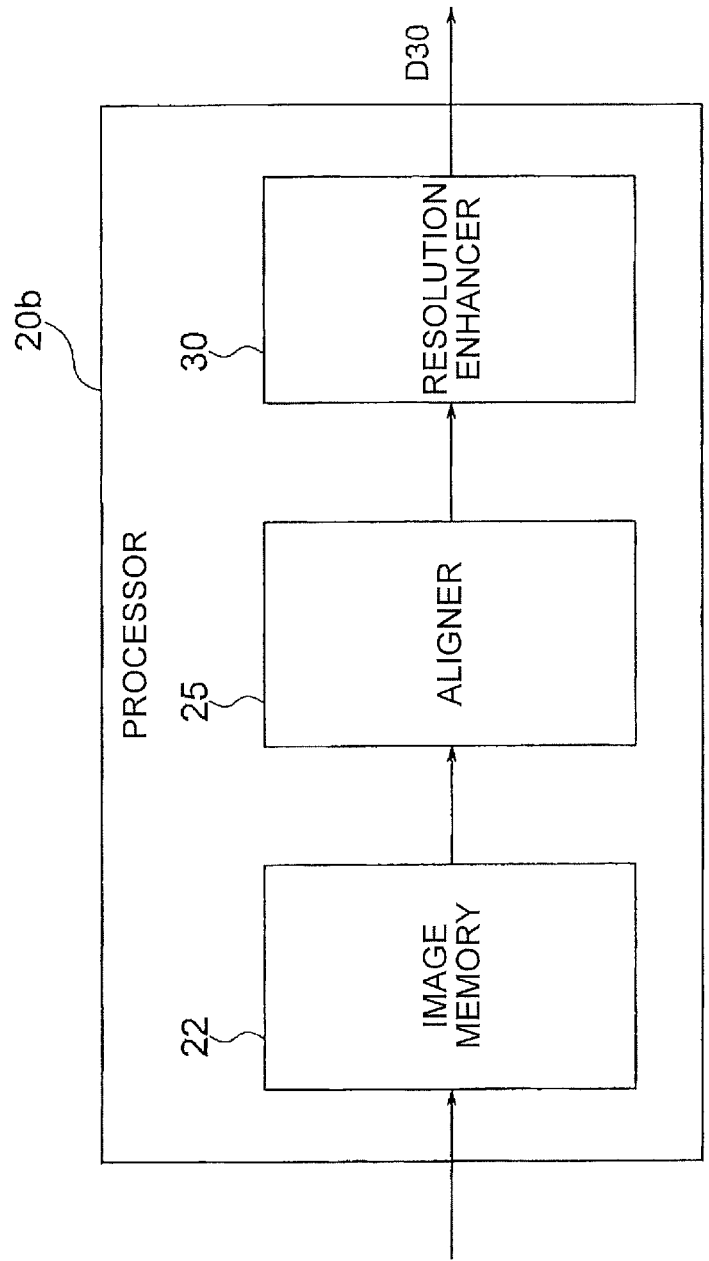
FIG. 7 is a block diagram illustrating another example of a processor used in the second embodiment.

FIG. 7 illustrates another example (denoted by reference character 20b) of the processor 20 used in the second embodiment. The processor 20b illustrated in FIG. 7 includes an aligner 25 in addition to the image memory 22 and resolution enhancer 30.

When there is misalignment between the low-resolution image D1 and the high-resolution image D0 output from the camera device 1, the aligner 25 performs alignment processing before the resolution enhancement by the resolution enhancer 30. As the alignment processing, it is possible to perform a fixed-value alignment using initial misalignment (correction) information, a dynamic alignment including registration (image matching), or the like.

The resolution enhancer 30 performs the resolution enhancement with the images aligned by the aligner 25 as inputs.

It is also possible to provide multiple resolution enhancers that are the same as one of the resolution enhancers (30a and 30b) described in FIGS. 5 and 6 and the resolution enhancers described as their modifications, input different low-resolution images to the respective resolution enhancers, and perform resolution enhancement on the input low-resolution image by using a high-resolution image as a reference image in each resolution enhancer.

The high-resolution images used as the reference images by the multiple resolution enhancers may be the same or different.

It is also possible to provide multiple combinations of the aligner 25 and resolution enhancer 30 described in FIG. 7.

Figure 8:
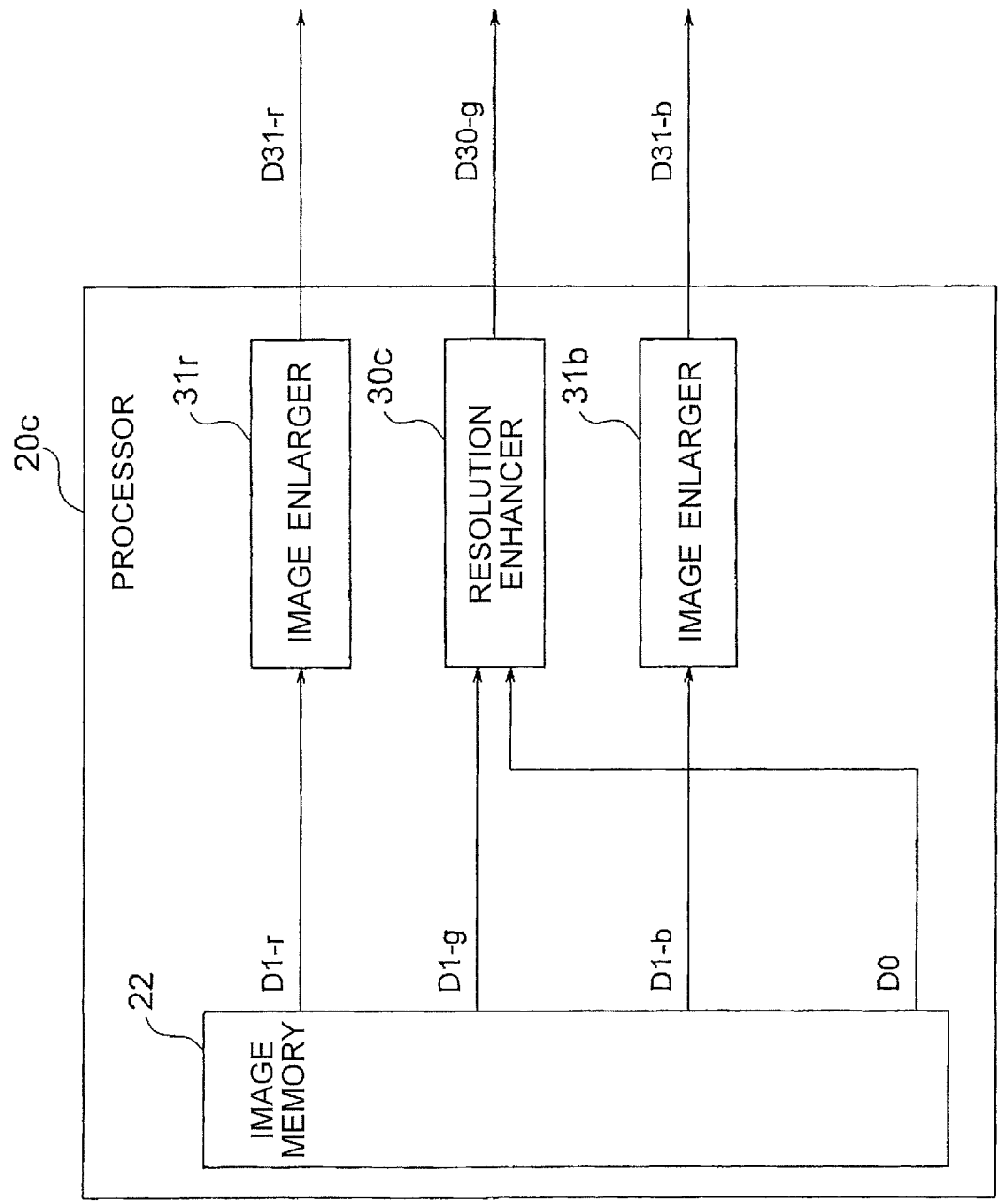
FIG. 8 is a block diagram illustrating another example of the processor used in the second embodiment.

FIG. 8 illustrates another example (denoted by reference character 20c) of the processor used in the second embodiment.

The processor 20c illustrated in FIG. 8 includes an image memory 22, a resolution enhancer 30c, and image enlargers 31r and 31b.

The example of FIG. 8 assumes a case where the imaging surface 11a includes one high-resolution imaging region 15a and three or more low-resolution imaging regions, for example, as in FIG. 2A, and the high-resolution imaging region 15a acquires G information and three low-resolution imaging regions (e.g., 15b, 15c, and 15d) respectively acquire an R image, a G image, and a B image.

In this case, three low-resolution images D1-r, D1-g, and D1-b respectively represent the R, G, and B images having low resolution. Also, the G image acquired in the high-resolution imaging region 15a is denoted by reference character D0.

The image enlargers 31r and 31b enlarge the images D1-r and D1-b to the same resolution as the high-resolution image D0 to generate enlarged images D31-r and D31-b, respectively.

The resolution enhancer 30c replaces the image D1-g with the image D0 and outputs the image obtained by the replacement as a high-resolution image D30-g.

Such processing can greatly reduce the calculation amount or calculation time for the image processing and reduce the hardware cost of the processor.

In the configuration of FIG. 8, it is also possible to provide the aligner 25 (illustrated in FIG. 7) before the resolution enhancer 30c. Further, it is also possible to provide similar aligners before the image enlargers 31r and 31b.

Advantages obtained by the compound-eye imaging device 100 of the second embodiment will now be described.

In the compound-eye imaging device 100 of the second embodiment, multiple images having different types of information are acquired from the multiple imaging regions of the camera device, these images include an image having relatively low resolution and an image having relatively high resolution, and the resolution of the image having relatively low resolution is enhanced using a high-resolution component of the image having relatively high resolution, and thus it is possible to obtain multiple images having high resolution and having different types of information.

Thus, even when an imaging region for acquiring images having different types of information is small, an image having high resolution can be generated, and it is possible to obtain images having different types of information with high resolution while reducing the size of the camera device.

Third Embodiment

Figure 9:
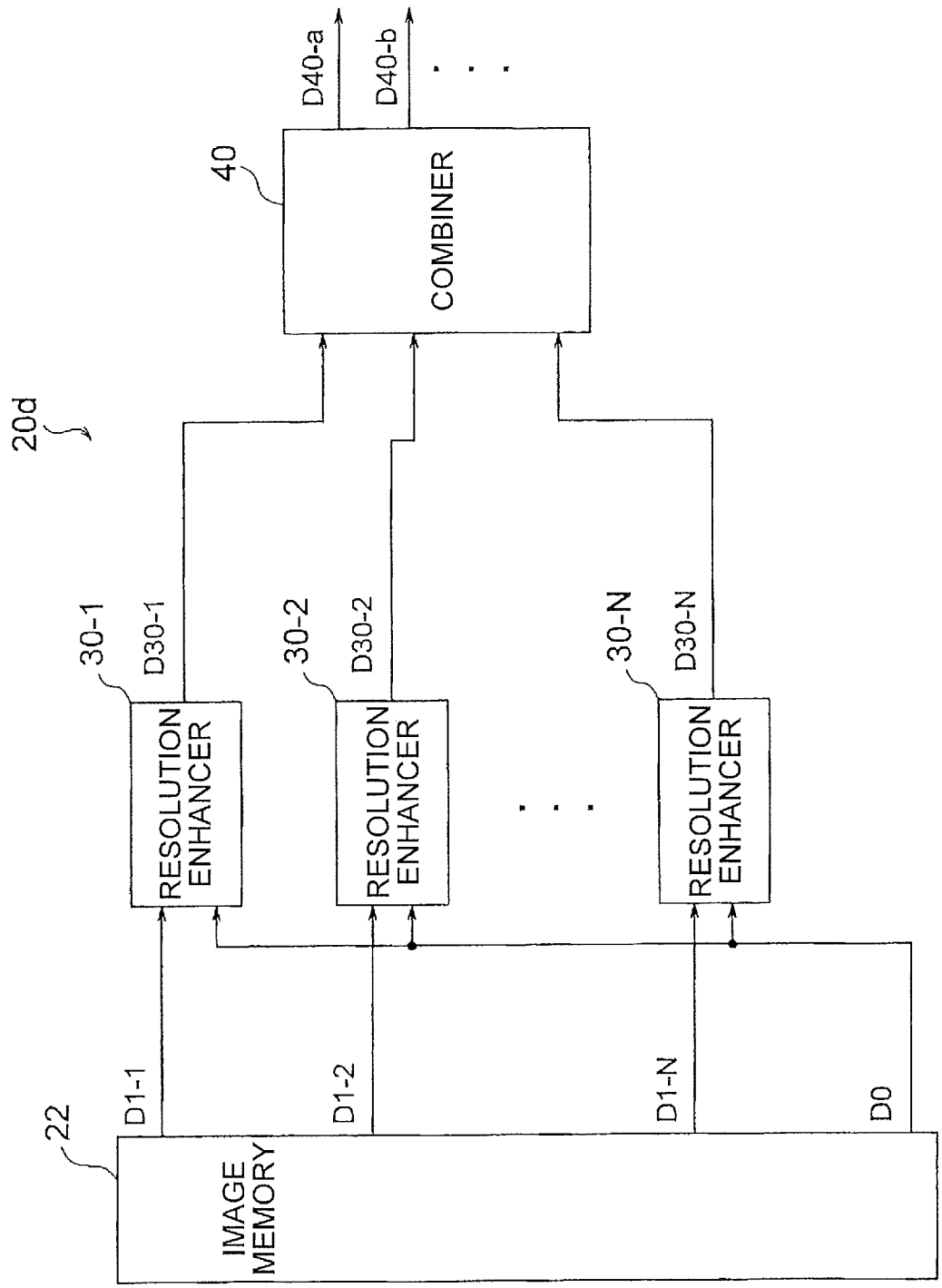
FIG. 9 is a block diagram illustrating an example of a processor used in a third embodiment of the present invention.

FIG. 9 illustrates an example (denoted by reference character 20d) of a processor 20 used in a compound-eye imaging device according to a third embodiment of the present invention. The processor 20d illustrated in FIG. 9 includes an image memory 22, multiple, specifically first to Nth (N being an integer of 2 or more), resolution enhancers 30-1 to 30-N, and a combiner 40. Except for the processor 20d, the compound-eye imaging device of the third embodiment is configured in the same manner as FIG. 4, for example.

The first to Nth resolution enhancers 30-1 to 30-N are respectively provided to correspond to N low-resolution imaging regions (e.g., 15b, 15c, . . . in the example of FIG. 2A), respectively receive low-resolution images D1-1 to D1-N acquired in the corresponding low-resolution imaging regions, and receive a high-resolution image D0 acquired in the high-resolution imaging region 15a.

The resolution enhancer 30-n (n being one of the integers from 1 to N) enhances the resolution of the low-resolution image D1-n by using the high-resolution image D0 as a reference image and generates a high-resolution image D30-n. Such processing is performed by all the resolution enhancers 30-1 to 30-N, so that multiple high-resolution images D30-1 to D30-N having different types of information are generated.

Each of the resolution enhancers 30-1 to 30-N is configured as described in FIG. 5, 6, or 8, for example.

The combiner 40 receives the multiple high-resolution images D30-1 to D30-N having the different types of information, and generates one or more combined high-resolution images D40-a, D40-b, . . .

Specifically, the combiner 40 combines the high-resolution images D30-1 to D30-N having the different types of information and generated by the resolution enhancers 30-1 to 30-N and generates the combined high-resolution images D40-a, D40-b, . . .

The combining processing in the combiner 40 can be performed by, for example, pan-sharpening processing, weighted addition of images, intensity combination, or region selection. The region selection may be performed on the basis of the visibility of an image estimated using a local variance as an index, for example.

Among the above, pan-sharpening techniques are used in satellite image processing (remote sensing) or the like, and pan-sharpening processing includes converting an RGB color image into an HSI (hue, saturation, intensity) image, replacing the I values of the HSI image resulting from the conversion with pixel values of a monochrome image that is a high-resolution image, and converting the HSI image with the replaced pixel values back to an RGB image.

Figure 10:
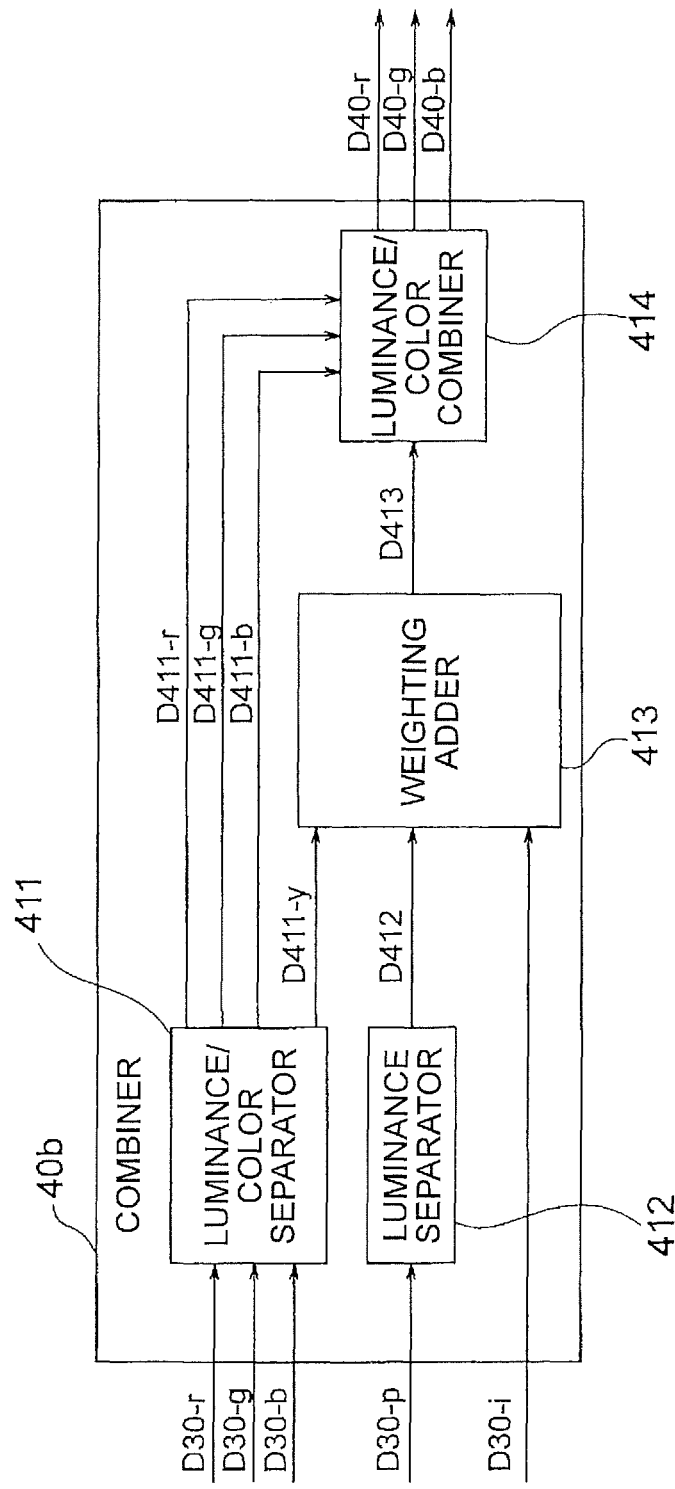
FIG. 10 is a block diagram illustrating an example of a combiner used in the third embodiment.

FIG. 10 illustrates an example (denoted by reference character 40b) of the combiner 40.

The combiner 40b illustrated in FIG. 10 includes a luminance/color separator 411, a luminance separator 412, a weighting adder 413, and a luminance/color combiner 414, and performs combination by weighted addition of luminance.

The combiner 40b receives an R image D30-r, a G image D30-g, a B image D30-b, a polarization image D30-p, and NIR (near-infrared) image D30-i subjected to resolution enhancement by the multiple resolution enhancers 30-1, 30-2, . . . (each of which is the same as that described in FIG. 5, 6, 8, or the like).

The images D31-r and D31-b enlarged by the image enlargers 31r and 31b illustrated in FIG. 8 may be input to the combiner 40b and used instead of the high-resolution images. Thus, the combiner 40b may be configured to combine one or more high-resolution images and one or more enlarged images.

The luminance/color separator 411 receives the R image D30-r, G image D30-g, and B image D30-b, and separates them into a luminance component D411-y and color components (components of R, G, and B colors) D411-r, D411-g, and D411-b.

The luminance separator 412 receives the polarization image D30-p and separates a luminance component D412.

The weighting adder 413 weights the luminance component D412 of the polarization image output from the luminance separator 412 and the NIR image D30-i input to the combiner 40b and adds them to the luminance component D411-y output from the luminance/color separator 411, thereby obtaining a combined luminance component D413.

The luminance/color combiner 414 combines the color components D411-r, D411-g, and D411-b output from the luminance/color separator 411 and the combined luminance component D413 obtained by the weighting adder 413, thereby generating an R image D40-r, a G image D40-g, and a B image D40-b.

The R image D40-r, G image D40-g, and B image D40-b output from the luminance/color combiner 414 have luminance information enhanced by the luminance component of the polarization image D30-p and the NIR image D30-i.

In the weighted addition by the weighting adder 413, it is possible to use a method of adding a pixel value multiplied by a gain depending on an image.

Instead, it is also possible to extract high-frequency components from the respective images (the luminance component D411-y output from the luminance/color separator 411, the luminance component D412 output from the luminance separator 412, and the NIR image D30-*i* input to the combiner 40*b*) by filter processing, weight and add them, and obtain the weighted average.

Figure 11:
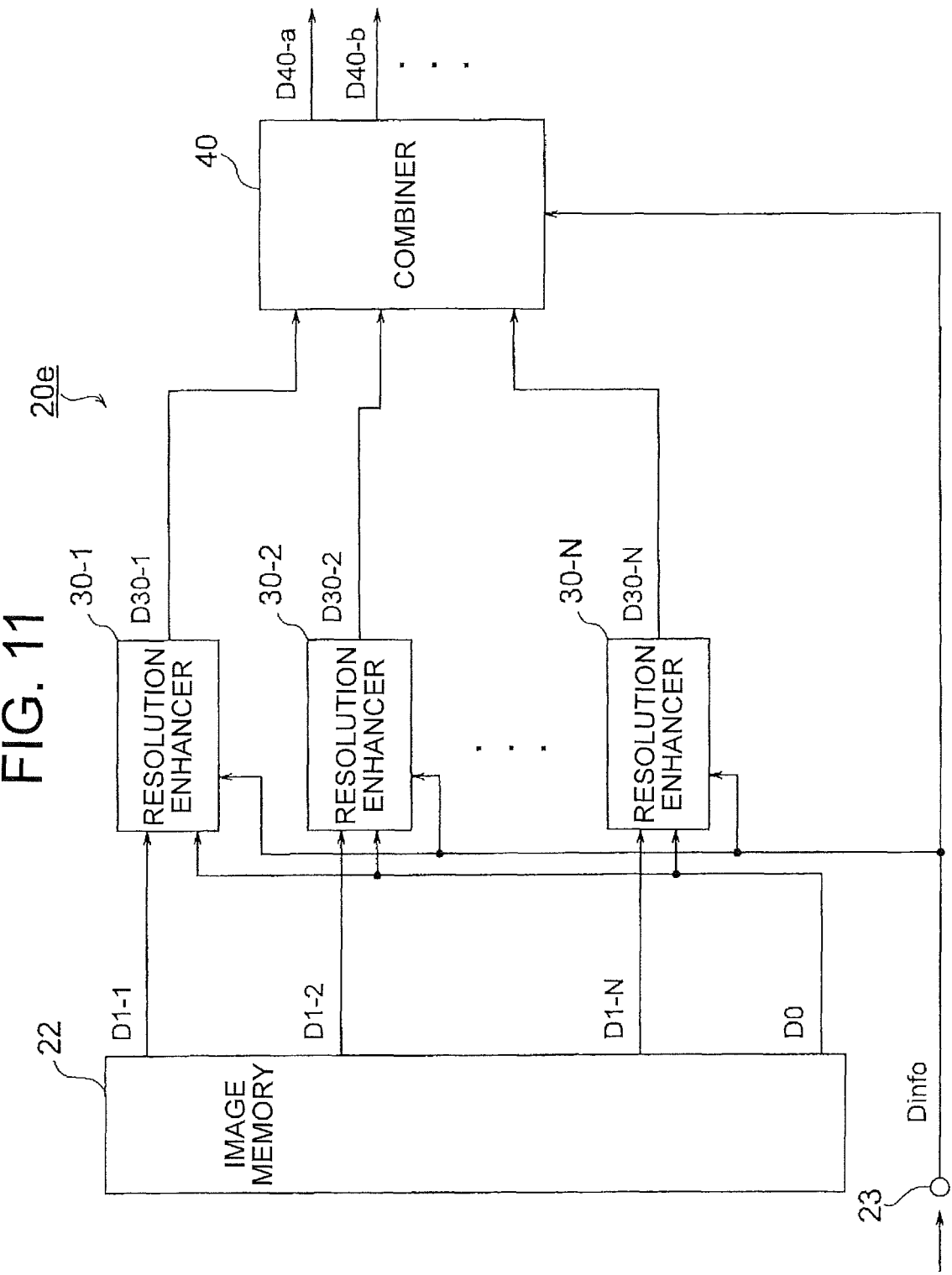
FIG. 11 is a block diagram illustrating another example of the processor used in the third embodiment.

FIG. 11 illustrates another example (denoted by reference character 20*e*) of the processor 20 used in the third embodiment.

The processor 20*e* illustrated in FIG. 11 includes a camera information input terminal 23 in addition to an image memory 22, multiple resolution enhancers 30-1 to 30-N, and a combiner 40, and receives compound-eye camera information Dinfo from the compound-eye camera 10 through the terminal 23 and transmits the compound-eye camera information Dinfo to the resolution enhancers 30-1 to 30-N and combiner 40.

The compound-eye camera information Dinfo includes information indicating wavelengths acquired in the respective imaging regions, information indicating polarization directions, information indicating the positions (the positions in the imaging surfaces) of the respective imaging regions, and the like.

By inputting the compound-eye camera information Dinfo to the resolution enhancers 30-1 to 30-N and combiner 40, it is possible to improve the accuracy in the resolution enhancement, combination processing, or the like, or increase information obtained by these processes.

For example, when the compound-eye camera information Dinfo indicates the spectral properties of the optical filters provided to the respective imaging regions, it is possible to extract a near-infrared image from RGB images and a monochrome image in the combination processing.

As described above, with the third embodiment, by enhancing the resolutions of multiple images having different types of information acquired by the camera device and then combining them, it is possible to generate a more useful image according to the intended use.

Fourth Embodiment

Figure 12:
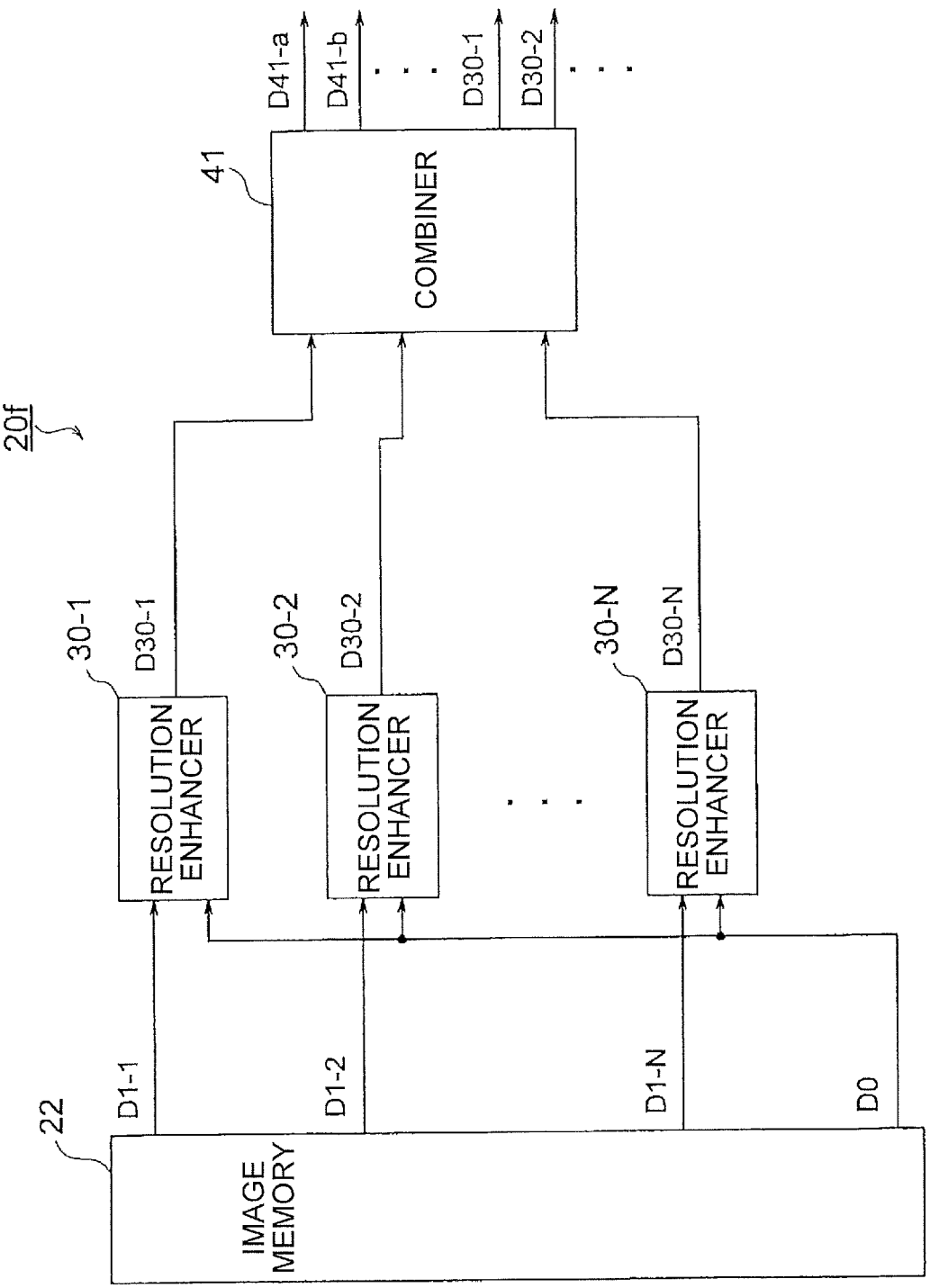
FIG. 12 is a block diagram illustrating a processor used in a fourth embodiment of the present invention.

FIG. 12 illustrates a configuration example (denoted by reference character 20*f*) of a processor 20 used in a compound-eye imaging device according to a fourth embodiment of the present invention. The processor 20*f* illustrated in FIG. 12 includes an image memory 22, multiple, specifically first to Nth, resolution enhancers 30-1 to 30-N, and a combiner 41. Except for the processor 20*f*, the compound-eye imaging device of the fourth embodiment is configured in the same manner as FIG. 4, for example. The resolution enhancers 30-1 to 30-N are the same as those described in FIG. 9, for example.

The combiner 41 receives high-resolution images D30-1 to D30-N output from the resolution enhancers 30-1 to 30-N, and generates, from them, high-resolution images D41-*a*, D41-*b*, . . . representing information different in type from them by interpolation.

In this case, it is assumed that the images D1-1, D1-2, . . . acquired in the multiple low-resolution imaging regions (e.g., 15*b*, 15*c*, . . . in the example of FIG. 2A) include multiple images having different types or values of at least one parameter of one or more parameters indicating the imaging conditions, and thus the high-resolution images D30-1, D30-2, . . . generated from these low-resolution images D1-1, D1-2, . . . include multiple images having different types or values of at least one parameter of one or more parameters indicating the imaging conditions.

The combiner 41 generates (reconstructs), by interpolation from the multiple high-resolution images D30-1, D30-2, . . . , high-resolution images D41-*a*, D41-*b*, . . . having a type or value of the at least one parameter different from that of any of the multiple high-resolution images D30-1, D30-2, . . .

For example, a restoration technique used in compressed sensing can be applied to the interpolation.

Figure 13:
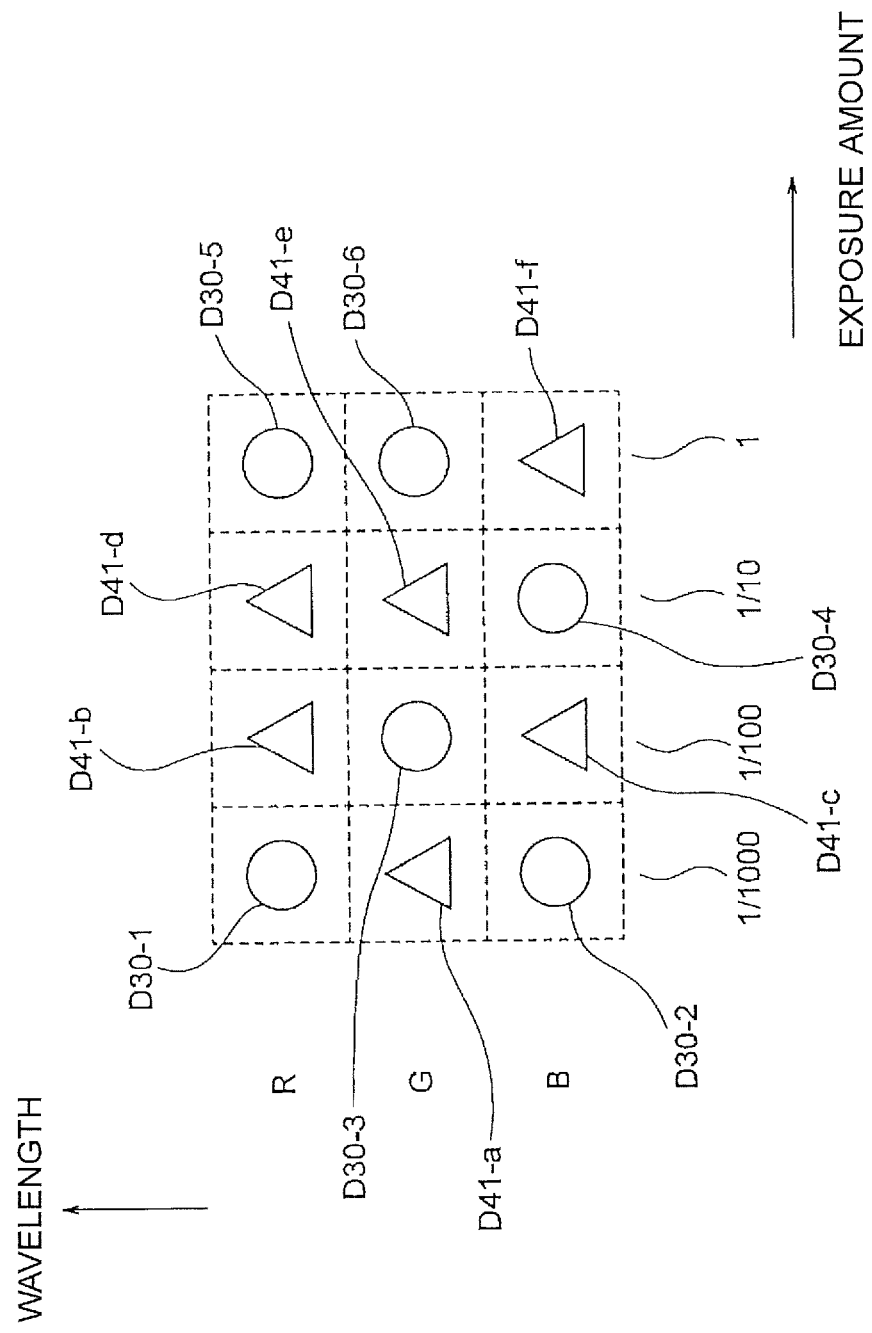
FIG. 13 is a diagram illustrating an example of interpolation of image information by the processor in the fourth embodiment.

An example of the generation of the images by interpolation will be described below with reference to FIG. 13. In the example of FIG. 13, different types of parameters are a wavelength and an exposure amount. For the wavelength, the values of the parameter are R, G, and B (a representative wavelength in an R wavelength range, a representative wavelength in a G wavelength range, and a representative wavelength in a B wavelength range), and for the exposure amount, the values of the parameter are $1/1000$, $1/100$, $1/10$, and 1. These values are relative values based on the case where no optical filter is used.

Suppose that images with the parameter combinations indicated by the circles in FIG. 13 are input to the combiner 41 as the high-resolution images D30-1, D30-2, .. For example, the high-resolution image D30-1 is an image obtained by enhancing the resolution of an image acquired by imaging at an exposure amount of $1/1000$ in an imaging region provided with an optical filter that transmits light in an R wavelength range. Likewise, the high-resolution image D30-2 is an image obtained by enhancing the resolution of an image acquired by imaging at an exposure amount of $1/1000$ in an imaging region provided with an optical filter that transmits light in a B wavelength range.

The combiner 41 generates, from the high-resolution images D30-1 to D30-6, by interpolation, images D41-*a* to D41-*f* corresponding to the parameter combinations indicated by the triangles. For example, the image D41-*a* is an image presumed to be generated by enhancing the resolution of an image acquired by imaging at an exposure amount of $1/1000$ in an imaging region provided with an optical filter that transmits light in a G wavelength range.

The combiner 41 outputs not only the generated images D41-*a* to D41-*f* but also the input images D30-1 to D30-6.

By performing such processing, the larger number of high-resolution images D30-1 to D30-6 and D40-*a* to D40-*f* having different types of information are obtained.

Advantages obtained by the compound-eye imaging device of the fourth embodiment will now be described.

With the fourth embodiment, it is possible to generate, from a relatively small number of images acquired by imaging and having different types of information, a larger number of images having different types of information. Thus, even when the number of imaging regions is not large, many types of information can be obtained.

Fifth Embodiment

Figure 14:
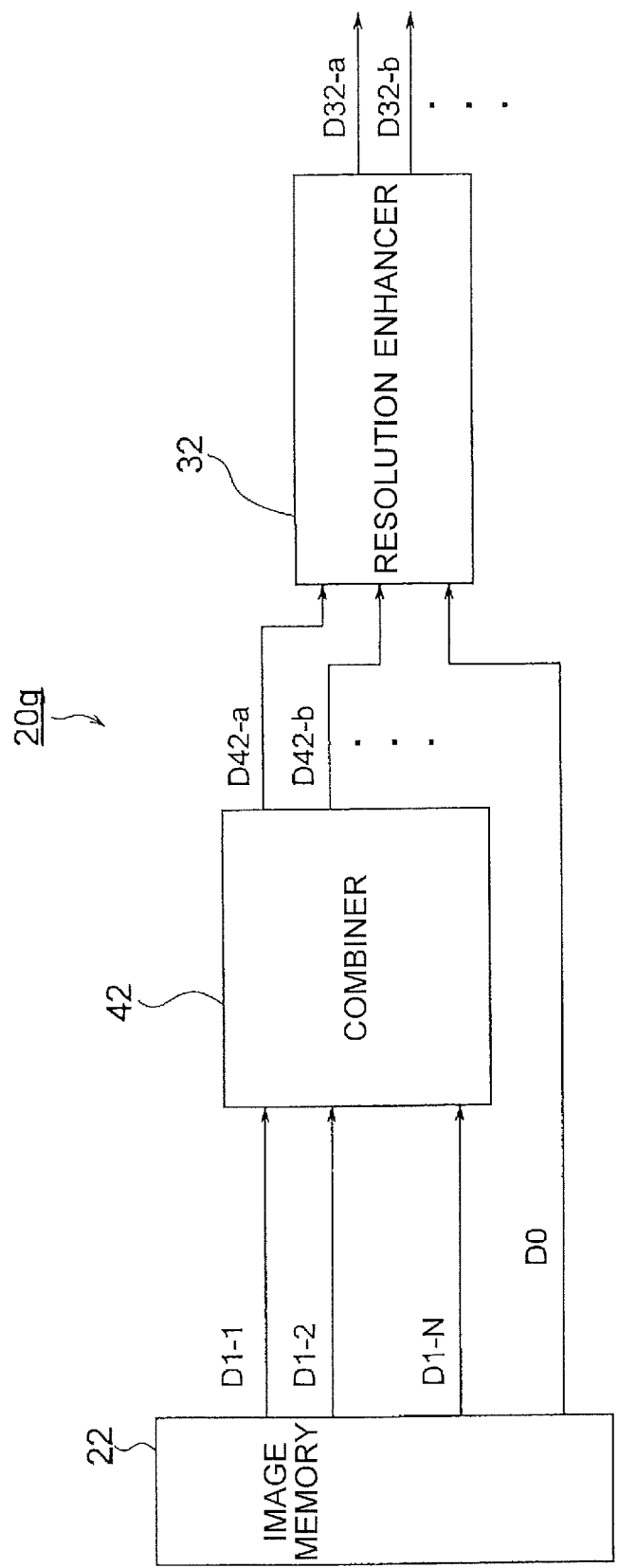
FIG. 14 is a block diagram illustrating a processor used in a fifth embodiment of the present invention.

FIG. 14 illustrates a configuration example (denoted by reference character 20*g*) of a processor 20 used in a compound-eye imaging device according to a fifth embodiment of the present invention. The processor 20*g* illustrated in FIG. 14 includes an image memory 22, a combiner 42, and a resolution enhancer 32. Except for the processor 20*g*, the compound-eye imaging device of the fifth embodiment is configured in the same manner as FIG. 4, for example.

The combiner 42 performs combination processing on images D1-1 to D1-N acquired in the low-resolution imaging regions (e.g., 15*b*, 15*c*, . . . in the example of FIG. 2A) and having different types of information, thereby generating one or more combined images (combined low-resolution images) D42-*a*, D42-*b*, . . .

The resolution enhancer 32 performs resolution enhancement on one or more combined images of the combined images D42-a, D42-b, . . . output from the combiner 42 by using the reference image D0, thereby generating high-resolution images (high-resolution combined images) D32-a, D32-b, . . .

When the number of combined images D42-a, D42-b, . . . generated by the combination by the combiner 42 is less than the number of input images D1-1 to D1-N, performing the resolution enhancement after the combination can reduce processing for resolution enhancement and reduce the calculation amount as a whole.

Sixth Embodiment

Figure 15:
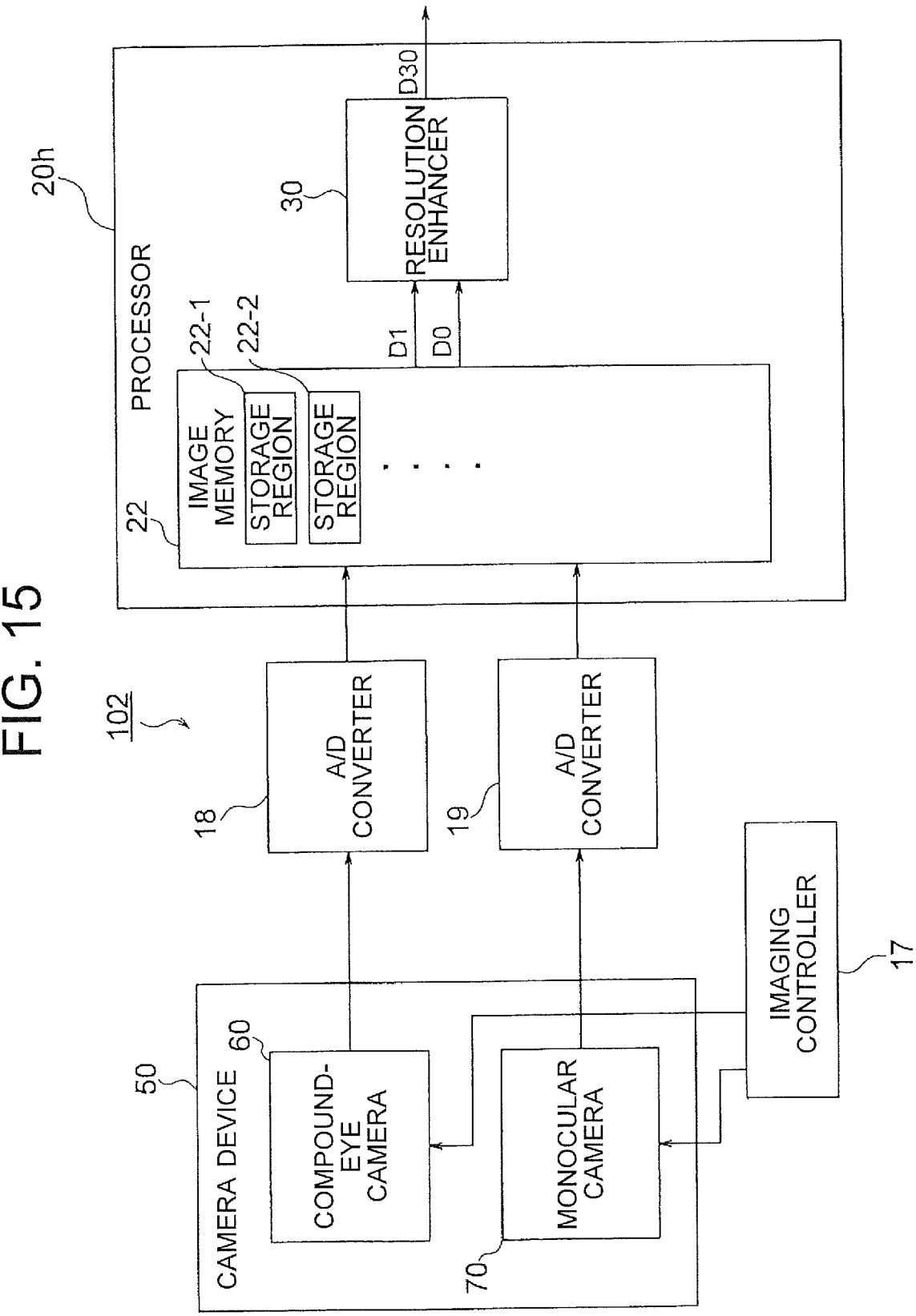
FIG. 15 is a block diagram illustrating a compound-eye imaging device according to a sixth embodiment of the present invention.

FIG. 15 is a block diagram illustrating a compound-eye imaging device 102 according to a sixth embodiment of the present invention.

The compound-eye imaging device 102 according to the sixth embodiment includes a camera device 50, an imaging controller 17, A/D converters 18 and 19, and a processor 20h.

Figure 16:
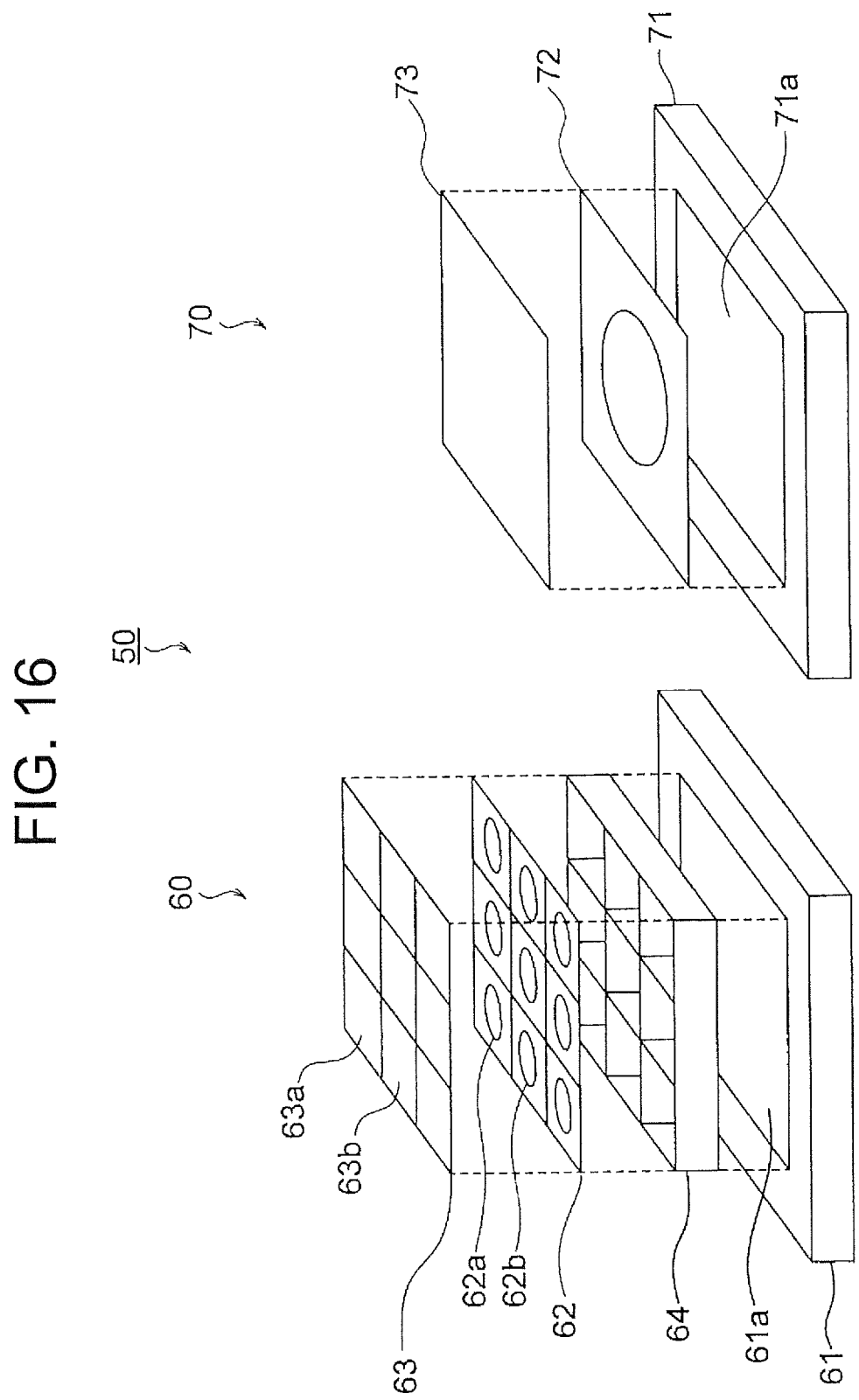
FIG. 16 is an exploded perspective view illustrating configurations of a compound-eye camera and a monocular camera according to the sixth embodiment.

FIG. 16 is an exploded perspective view of the camera device 50. The camera device 50 includes a compound-eye camera 60 and a monocular camera 70.

As described below in detail, as the compound-eye camera 60, one having an imaging surface divided into multiple imaging regions like the compound-eye camera 10 illustrated in FIG. 1A is used, and on the other hand, the monocular camera 70 has an imaging surface that is not divided, and an image acquired by the monocular camera 70 is used instead of the image acquired in the high-resolution imaging region of the compound-eye camera 10 of FIG. 1A.

The compound-eye camera 60 includes an imaging element 61, a lens array 62, a filter array 63, and a partition 64.

Figure 17A:
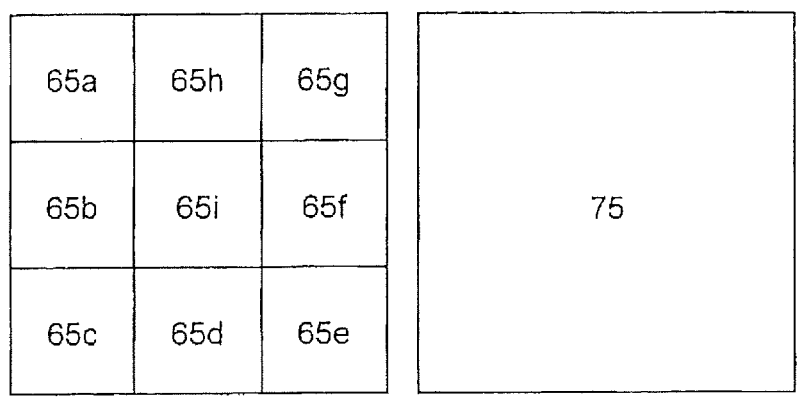
FIGS. 17A and 17B are each a schematic diagram illustrating an example of how to divide an imaging surface of an imaging element of the compound-eye camera of FIG. 16.

The imaging element 61 has a rectangular imaging surface 61a, and the imaging surface 61a is divided into multiple, e.g., nine, imaging regions 65a to 65i, for example, as illustrated in FIG. 17A. These nine imaging regions 65a to 65i have the same size and are arranged in three rows and three columns.

Figure 17B:
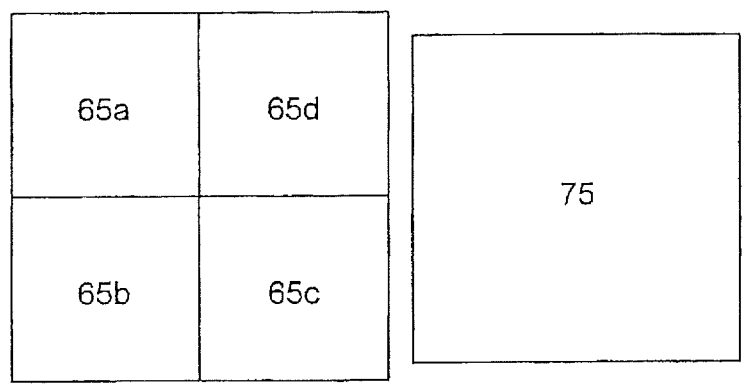

FIG. 17B illustrates another example of how to divide the imaging surface 61a. In the example illustrated in FIG. 17B, the imaging surface 61a of the imaging element 61 of the compound-eye camera 60 is divided into four imaging regions 65a to 65d. These four imaging regions 65a to 65d have the same size and are arranged in two rows and two columns.

Although the imaging regions 65a, 65b, . . . of the compound-eye camera 60 can have the same size as in the examples of FIGS. 17A and 17B, the present invention is not limited to this, and the imaging regions 65a, 65b, . . . can have different sizes.

Even when they have different sizes, they preferably have the same aspect ratio.

The lens array 62 includes lenses 62a, 62b, . . . that are provided to correspond to the respective imaging regions 65a, 65b, . . . and image images of the same field of view onto the respective corresponding imaging regions.

The filter array 63 includes optical filters 63a, 63b, . . . provided to one or more imaging regions of the multiple imaging regions.

The partition 64 is provided between the imaging regions 65a, 65b, . . . and prevents each imaging region from receiving light from the lenses other than the corresponding lens.

The monocular camera 70 includes an imaging element 71, a lens 72, and an optical filter 73.

The imaging element 71 also has a rectangular imaging surface 71a. The entire imaging surface 71a forms a single imaging region 75.

FIGS. 17A and 17B each schematically illustrate a positional relationship of the imaging region 75 of the monocular camera 70 to the imaging regions 65a, 65b, . . . of the compound-eye camera 60.

The imaging region 75 formed by the entire imaging surface 71a of the imaging element 71 of the monocular camera 70 has more pixels than any of the imaging regions 65a, 65b, . . . of the compound-eye camera 60. Thus, the resolution of the imaging region 75 of the monocular camera 70 is higher than the resolution of a largest imaging region of the imaging regions 65a, 65b, . . . of the compound-eye camera 60.

The imaging region 75 has the same aspect ratio as the imaging regions 65a, 65b, . . .

The imaging region 75 of the monocular camera 70 is an imaging region differing in resolution from the imaging regions 65a, 65b, . . . of the compound-eye camera, and the former is higher in resolution than the latter. For distinction, the former may be referred to as an imaging region of the first type, and the latter may be referred to as imaging regions of the second type.

The lens 72 of the monocular camera 70 is provided so that an image of the same field of view as images imaged onto the respective imaging regions of the compound-eye camera 60 is imaged onto the imaging region 75.

The lenses 62a, 62b, . . . of the compound-eye camera 60 and the lens 72 of the monocular camera 70 constitute a lens group.

The optical filters 63a, 63b, . . . constituting the filter array 63 and the optical filter 73 include optical filters having different optical properties, so that different types of information (images representing different types of information) are acquired from the respective imaging regions.

For example, it is possible to select the optical filters for the respective imaging regions on the assumption that the high-resolution imaging region 15a of FIG. 2A of the first embodiment is replaced with the imaging region 75 of the monocular camera 70 and the low-resolution imaging regions 15b, 15c, . . . of FIG. 2A are replaced with the imaging regions 65a, 65b, . . . of the compound-eye camera 60. That is, it is possible to provide an optical filter having the same properties as the optical filter provided to the high-resolution imaging region 15a of FIG. 2A to the imaging region 75 of the monocular camera 70 in the sixth embodiment, and provide optical filters having the same properties as the optical filters provided to the low-resolution imaging regions 15b, 15c, . . . of FIG. 2A to the imaging regions 65a, 65b, . . . of the compound-eye camera 60 in the sixth embodiment.

It is possible to provide no optical filters to one or more imaging regions, e.g., the imaging region 75, of the imaging regions 75, 65a, 65b, . . . (set the one or more imaging regions to be monochrome regions).

The imaging controller 17 controls imaging by the compound-eye camera 60 and imaging by the monocular camera 70. For example, it controls the timings or exposure amounts of imaging by the two cameras. The imaging timing control is performed so that the two cameras substantially simultaneously perform imaging.

The processor 20h of the compound-eye imaging device 102 of this embodiment is supplied with images acquired in the multiple imaging regions of the compound-eye camera 60 and an image acquired by the monocular camera 70 through the A/D converters 18 and 19, respectively.

The processor 20h includes an image memory 22 and at least one resolution enhancer 30.

The image memory 22 preferably has multiple storage regions 22-1, 22-2, . . . corresponding to the multiple imaging regions of the compound-eye camera 60 and the imaging region of the monocular camera 70 on a one-to-one basis.

The resolution enhancer 30 receives, as a reference image, a high-resolution image D0 acquired by the monocular camera 70, receives, as a low-resolution image, an image D1 acquired in one of the imaging regions of the compound-eye camera 60, and enhances the resolution of the low-resolution image D1 by using a high-resolution component included in the reference image D0, thereby generating a high-resolution image D30.

As above, when the camera device 1 of the first embodiment is used, with an image acquired in a high-resolution imaging region (15a or the like) of the compound-eye camera 10 as the reference image, the resolution of an image acquired in a low-resolution imaging region of the same compound-eye camera 10 is enhanced; on the other hand, when the camera device 50 of the sixth embodiment is used, with an image acquired by the imaging element of the monocular camera 70 as the reference image, the resolution of a low-resolution image acquired by the compound-eye camera 60 is enhanced.

Otherwise, the sixth embodiment is the same as the second embodiment. For example, the processing by the resolution enhancer 30 can be performed in the same manner as that described in the second embodiment with reference to FIG. 5, 6, 8, or the like.

Although it has been described that a processor that is the same as that described in the second embodiment is used as the processor 20h of the sixth embodiment, it is also possible to use a processor that is the same as that of the third, fourth, or fifth embodiment instead. In any case, the image acquired in the imaging region of the monocular camera 70 should be used as the reference image instead of the high-resolution image acquired in the high-resolution imaging region of the first embodiment.

In the example of FIG. 17A, a center of the imaging region 65i located at a center of the imaging surface 61a and a center of the imaging region 75 are horizontally aligned. Such an arrangement makes it possible to obtain depth information by performing stereo matching by using displacement due to parallax between the image acquired in the imaging region 65i and the image acquired in the imaging region 75.

Advantages obtained by the compound-eye imaging device 102 of the sixth embodiment will now be described.

In the compound-eye imaging device 102 of the sixth embodiment, the monocular camera 70 is provided separately from the compound-eye camera 60, and an image having high resolution can be acquired by the monocular camera 70. Thus, it is possible to enhance the resolution of an image acquired in each imaging region of the compound-eye camera 60 to a higher resolution.

Also, it is possible to make the imaging regions 65a, 65b, . . . of the compound-eye camera 60 all have the same shape as exemplified in FIGS. 17A and 17B, thereby reducing the manufacturing cost.

Further, since a distance between centers of the compound-eye camera 60 and the monocular camera 70 is relatively large, displacement due to parallax between the image acquired by the monocular camera 70 and the images acquired by the compound-eye camera 60 is greater than displacement due to parallax between the images acquired in the different imaging regions of the compound-eye camera 10 of the first embodiment, it is also possible to more accurately obtain depth information by taking advantage of the parallax.

In the first embodiment, a camera device is formed only by a compound-eye camera (10), and in the sixth embodiment, a camera device is formed by a compound-eye camera (60) and a monocular camera (70); however, in short, it is sufficient that a camera device have multiple imaging regions (an imaging region of a first type and imaging regions of a second type) having different sizes, and a group of filters be provided so that images representing different types of information are acquired in the multiple imaging regions. The different imaging regions may be formed in a single imaging element (11) as in the first embodiment, and may be formed in multiple imaging elements (61 and 71) as in the sixth embodiment. The multiple imaging regions having different sizes include at least one imaging region of a first type and multiple imaging regions of a second type having smaller areas and smaller numbers of pixels than the imaging region of the first type.

When the imaging region of the first type and the imaging regions of the second type are both formed in a single imaging element as in the first embodiment, the imaging region of the first type and the imaging regions of the second type are formed by dividing an imaging surface of the single imaging element, and a lens group includes a lens included in a lens array provided to the imaging surface.

In this case, a partition is provided to prevent each of the multiple imaging regions from receiving light from the lenses other than the corresponding lens.

When the imaging region of the first type and the imaging regions of the second type are formed in different imaging elements as in the sixth embodiment, the above-described "one or more imaging regions of the first type" are formed by a single imaging region formed by the entire imaging surface of a first imaging element (71), the multiple imaging regions of the second type are formed by dividing the imaging surface of a second imaging element (61), and a lens group includes a lens provided to the imaging surface of the first imaging element and a lens included in a lens array provided to the imaging surface of the second imaging element.

In this case, a partition is provided to prevent each of the multiple imaging regions of the second imaging element from receiving light from the lenses other than the corresponding lens.

Seventh Embodiment

The processors of the compound-eye imaging devices described in the second to sixth embodiments may be dedicated processors or may be computer's CPUs that execute programs stored in memories.

Figure 18:
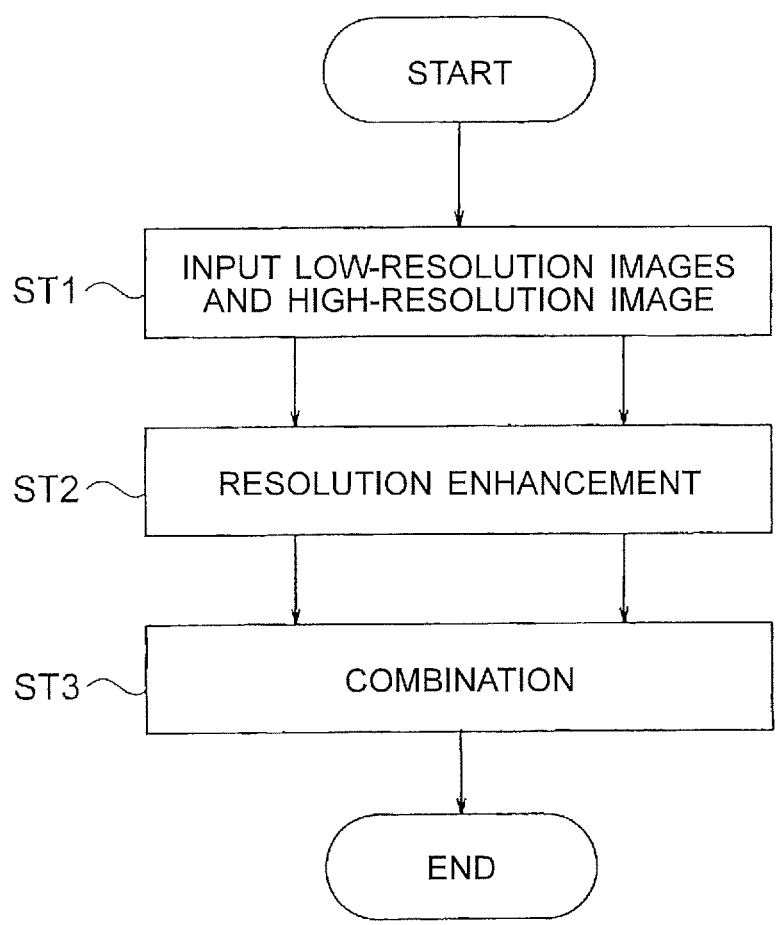
FIG. 18 is a flowchart illustrating a procedure of processing of an image processing method according to a seventh embodiment of the present invention.

As an example, a processing procedure in the case of causing a computer to execute image processing implemented by a compound-eye imaging device having the processor of FIG. 9 will be described below with reference to FIG. 18.

First, in step ST1, imaging is performed by, for example, the camera device 1 illustrated in FIG. 1A, and multiple low-resolution images D1-1 to D1-N representing different types of information and one high-resolution image D0 are acquired, and stored in a memory (having the same role as the image memory 22 of FIG. 9). Here, the low-resolution images D1-1 to D1-N and high-resolution image D0 are, for example, images having different types of information and acquired by imaging in the multiple imaging regions 15a, 15b, 15c, . . . of the camera device 1 illustrated in FIG. 1A onto which images of the same field of view are imaged, and of the images, images having relatively low resolution are acquired as the low-resolution images D1-1, D1-2, . . . and an image having relatively high resolution is acquired as the high-resolution image D0.

Next, in step ST2, resolution enhancement processing is performed on each of the multiple low-resolution images D1-1, D1-2, . . . by using the high-resolution image D0 as a reference image, so that high-resolution images D30-1, D30-2, . . . are generated. The resolution enhancement processing is the same as that described for the resolution enhancer of FIG. 5, 6, or 8, for example.

Next, in step ST3, the multiple high-resolution images D30-1, D30-2, . . . are combined to generate one or more combined high-resolution images D40-a, D40-b. The combination processing is performed as described for the combiner 40 of FIG. 9.

As described above, with the present invention, it is possible to acquire, in multiple imaging regions, images having different types of information and having different resolutions, and obtain a high-resolution image from relatively low-resolution images of the acquired images.

Although compound-eye imaging devices have been described above in the second to sixth embodiments, image processing methods implemented by the compound-eye imaging devices also form part of the present invention. Further, programs for causing a computer to execute processing of the above compound-eye imaging devices or image processing methods, and computer-readable recording media storing such programs also form part of the present invention.

REFERENCE SIGNS LIST 1 camera device, 10 compound-eye camera, 11 imaging element, 11a imaging surface, 12 lens array, 12a, 12b, . . . lens, 13 filter array, 13a, 13b, . . . optical filter, 14 partition, 15a high-resolution imaging region, 15b, 15c, . . . low-resolution imaging region, 17 imaging controller, 18, 19 A/D converter, 20, 20a to 20h processor, 22 image memory, 25 aligner, 30, 30a to 30c, 30-1 to 30-N resolution enhancer, 31r, 31b image enlarger, 32 resolution enhancer, 40, 42 combiner, 50 camera device, 60 compound-eye camera, 61 imaging element, 61a imaging surface, 62 lens array, 62a, 62b, . . . lens, 63 filter array, 63a, 63b, . . . optical filter, 64 partition, 65a, 65b, . . . low-resolution imaging region, 70 monocular camera, 71 imaging element, 71a imaging surface, 72 lens, 73 optical filter, 75 high-resolution imaging region, 100, 102 compound-eye imaging device, 311, 312 filter processor, 313 low-frequency component combiner, 314 high-frequency component combiner, 315 component combiner, 321 reduction processor, 322 coefficient calculator, 323 coefficient map enlarger, 324 linear converter, 411 luminance/color separator, 412 luminance separator, 413 weighting adder, 414 luminance/color combiner.

The invention claimed is:
1. A compound-eye imaging device comprising:
a camera device comprising:
an imaging element including a plurality of imaging regions;
a plurality of lenses disposed to correspond to the plurality of imaging regions and configured to image images of a same field of view onto the corresponding imaging regions; and
a plurality of optical filters,
wherein the plurality of imaging regions include at least one imaging region of a first type and a plurality of imaging regions of a second type having a same size and being smaller than the imaging region of the first type,
wherein the plurality of lenses have focal lengths such that lenses corresponding to larger imaging regions have greater focal lengths, and
wherein the plurality of optical filters are provided so that an image acquired in each of the imaging regions of the second type represents a different type of information from an image acquired in each of the at least one imaging region of the first type; and
a processor including at least one resolution enhancer, the at least one resolution enhancer including:
a first filter processor to receive, as a low-resolution image, the image acquired in one of the imaging regions of the second type, and extract, from the low-resolution image, a low-frequency component and a high-frequency component of the low-resolution image;
a second filter processor to receive, as a reference image, the image acquired in one of the at least one imaging region of the first type, and extract, from the reference image, a low-frequency component and a high-frequency component of the reference image;
a low-frequency component combiner to enlarge the low-frequency component of the low-resolution image to a same resolution as the reference image, and combine the enlarged low-frequency component and the low-frequency component of the reference image by weighted addition to generate a combined low-frequency component;
a high-frequency component combiner to enlarge the high-frequency component of the low-resolution image to a same resolution as the reference image, and combine the enlarged high-frequency component and the high-frequency component of the reference image by weighted addition to generate a combined high-frequency component; and
a component combiner to combine the combined low-frequency component and the combined high-frequency component to generate a high-resolution image.

2. The compound-eye imaging device of claim 1, wherein the at least one resolution enhancer comprises a plurality of resolution enhancers, and
wherein the processor further includes a combiner to combine the plurality of high-resolution images generated by the plurality of resolution enhancers to generate one or more combined high-resolution images.

3. The compound-eye imaging device of claim 2, wherein the plurality of low-resolution images subjected to the resolution enhancement by the plurality of resolution enhancers have different types or values of at least one parameter of one or more parameters indicating imaging conditions, and thus the plurality of high-resolution images generated by the plurality of resolution enhancers have different types or values of at least one parameter of one or more parameters indicating imaging conditions, and wherein the combiner generates, by interpolation from the plurality of high-resolution images, a high-resolution image having a type or value of the at least one parameter different from that of any of the plurality of high-resolution images.

4. The compound-eye imaging device of claim 1, wherein the processor includes:
a combiner to combine the images acquired in the plurality of imaging regions of the second type to generate at least one combined low-resolution image; and
a resolution enhancer to receive, as a reference image, the image acquired in one of the at least one imaging region of the first type, and enhance a resolution of the at least one combined low-resolution image by using a high-resolution component included in the reference image to generate at least one high-resolution combined image.

5. A non-transitory computer-readable recording medium storing a program for causing a computer to execute processing in the compound-eye imaging device of claim 1.

6. An image processing method comprising:
acquiring a plurality of images acquired by imaging in a plurality of imaging regions onto which images of a same field of view are imaged, the plurality of images having different types of information and different resolutions;
performing resolution enhancement processing on images of the plurality of images having the different resolutions that have relatively low resolution by using a high-resolution component included in an image of the plurality of images having the different resolutions that has relatively high resolution, thereby generating high-resolution images having different types of information; and
combining the high-resolution images having the different types of information, thereby generating one or more combined high-resolution images,
wherein the performing resolution enhancement processing includes:
extracting, from the images having relatively low resolution, low-frequency components and high-frequency components of the images;
extracting, from the image having relatively high resolution, a low-frequency component and a high-frequency component of the image;
enlarging the low-frequency components of the images having relatively low resolution to a same resolution as the image having relatively high resolution, combining the enlarged low-frequency components and the low-frequency component of the image having relatively high resolution by weighted addition to generate combined low-frequency components;
enlarging the high-frequency components of the images having relatively low resolution to a same resolution as the image having relatively high resolution, combining the enlarged high-frequency components and the high-frequency component of the image having relatively high resolution by weighted addition to generate combined high-frequency components; and
combining the combined low-frequency components and the combined high-frequency components to generate the high-resolution images.

7. The compound-eye imaging device of claim 1, wherein none of the optical filters for acquiring the images representing the different type of information is provided to the imaging region of the first type.

8. A compound-eye imaging device comprising:
a camera device comprising:
an imaging element including a plurality of imaging regions;
a plurality of lenses disposed to correspond to the plurality of imaging regions and configured to image images of a same field of view onto the corresponding imaging regions; and
a plurality of optical filters,
wherein the plurality of imaging regions include at least one imaging region of a first type and a plurality of imaging regions of a second type having a same size and being smaller than the imaging region of the first type,
wherein the plurality of lenses have focal lengths such that lenses corresponding to larger imaging regions have greater focal lengths, and
wherein the plurality of optical filters are provided so that an image acquired in each of the imaging regions of the second type represents a different type of information from an image acquired in each of the at least one imaging region of the first type; and
a processor including at least one resolution enhancer, the at least one resolution enhancer including:
a reduction processor to receive, as a reference image, the image acquired in one of the at least one imaging region of the first type, and reduce the reference image to generate a reduced reference image having a same resolution as a low-resolution image acquired in one of the imaging regions of the second type;
a coefficient calculator to calculate linear coefficients approximating a linear relationship between the reduced reference image and the low-resolution image;
a coefficient map enlarger to enlarge a coefficient map including the linear coefficients calculated by the coefficient calculator to a same resolution as the reference image; and
a linear converter to generate a high-resolution image having information represented by the low-resolution image on a basis of linear coefficients of the enlarged coefficient map and the reference image.

9. The compound-eye imaging device of claim 8, wherein the at least one resolution enhancer comprises a plurality of resolution enhancers, and
wherein the processor further includes a combiner to combine the plurality of high-resolution images generated by the plurality of resolution enhancers to generate one or more combined high-resolution images.

10. The compound-eye imaging device of claim 9, wherein the plurality of low-resolution images subjected to the resolution enhancement by the plurality of resolution enhancers have different types or values of at least one parameter of one or more parameters indicating imaging conditions, and thus the plurality of high-resolution images generated by the plurality of resolution enhancers have different types or values of at least one parameter of one or more parameters indicating imaging conditions, and
wherein the combiner generates, by interpolation from the plurality of high-resolution images, a high-resolution image having a type or value of the at least one parameter different from that of any of the plurality of high-resolution images.

11. The compound-eye imaging device of claim 8, wherein none of the optical filters for acquiring the images representing the different type of information is provided to the imaging region of the first type.

12. A non-transitory computer-readable recording medium storing a program for causing a computer to execute processing in the compound-eye imaging device of claim 8.

* * * * *